(12) United States Patent
Fohn et al.

(10) Patent No.: US 6,460,025 B1
(45) Date of Patent: Oct. 1, 2002

(54) INTELLIGENT EXPLORATION THROUGH MULTIPLE HIERARCHIES USING ENTITY RELEVANCE

(75) Inventors: Steffen Michael Fohn, Raleigh, NC (US); Arthur Reginald Greef, Seattle, WA (US); Donald Carl Willenborg, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,756

(22) Filed: Jul. 27, 1999

(51) Int. Cl.[7] .............................................. G06F 9/445
(52) U.S. Cl. ...................................................... 706/45
(58) Field of Search ..................... 716/1; 717/1; 706/45

(56) References Cited

U.S. PATENT DOCUMENTS 5,402,524 A * 3/1995 Bauman et al. ............... 706/45
5,555,201 A * 9/1996 Dangelo et al. ............... 716/1
5,680,619 A * 10/1997 Gudmundson et al. ........ 717/1

OTHER PUBLICATIONS

"Design and Analysis of Dynamic Huffman Codes", Jeffrey Scott Vitter, Brown University, Providence, Rhode Island, Journal of the Association for Computing Machinery (ACM), vol. 34, No. 4, Oct. 1987, pp. 825–845.*

"Hierarchical Representatio9ns of Collections of Small Rectangles", Hanan Samet, Computer Science Department, Center forAutomation Research, and Institute for Advanced Computer Studies, University of Maryland, ACM Computing Surveys, vol. 20, No. 4, 12/88.*

"Encyclopedia of Artificial Intelligence" vol. 1 & 2, Stuart C. Shapiro, Editor-in-Chief, State University of New York at Buffalo, Copyright© 1990 by John Wiley & Sons, Inc. (Index pp. 1186–1187, Hierarchies).*

* cited by examiner

Primary Examiner—Thomas Black
Assistant Examiner—Michael B. Holmes
(74) Attorney, Agent, or Firm—A. Bruce Clay; Marcia L. Doubet

(57) ABSTRACT

A method, system, and computer readable code for improving user exploration (i.e. navigation and browsing) through hierarchies of information. Entity relevance is calculated for the entities in the hierarchies, and this information is used to guide the user in his exploration. Two types of entity relevance are used, structural relevance and state relevance. Structural relevance is preferably pre-computed, being static in nature. State relevance is dynamically computed, as the user selects nodes or categories during exploration. Each selection serves to further constrain the solution space. Entities are determined to be strongly relevant, weakly relevant, or irrelevant for the current solution space. Node feasibility is also dynamically calculated, and provides a forward-looking indication of which nodes can be selected while still remaining consistent with the current solution space.

19 Claims, 22 Drawing Sheets

Overview of Intelligent Hierarchical Exploration

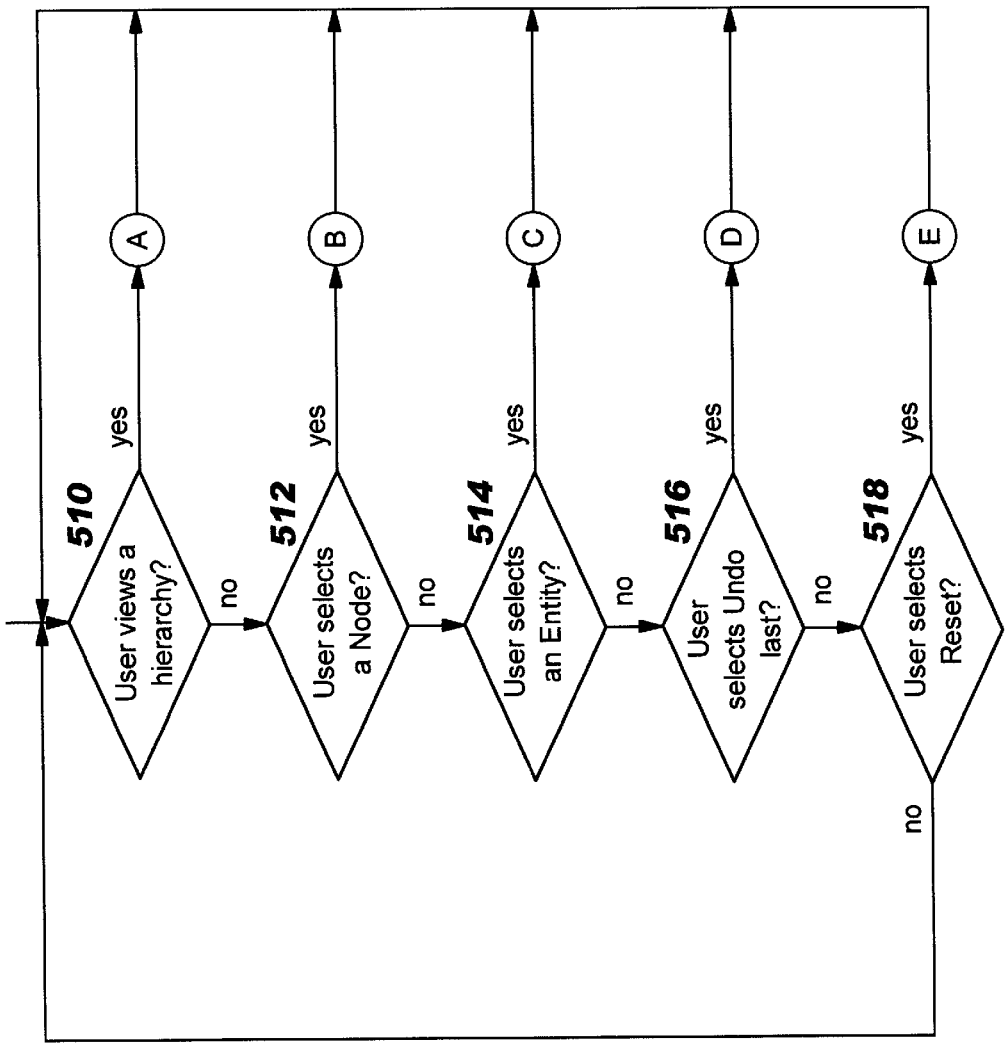
FIG. 5C Facilitate User Exploration

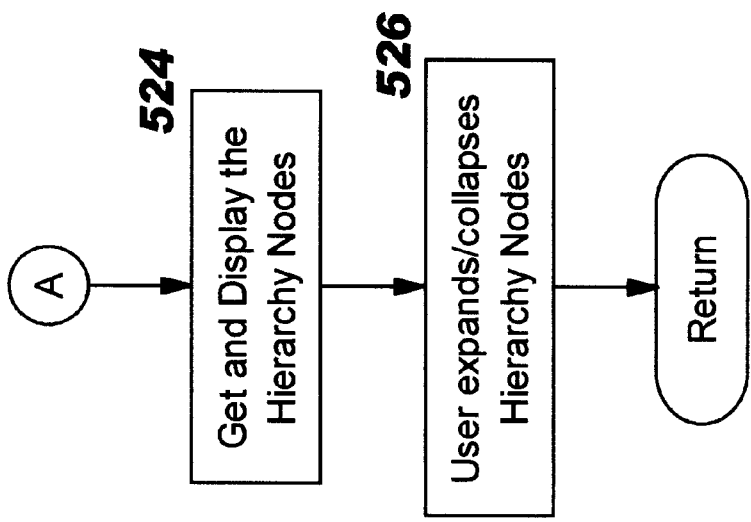

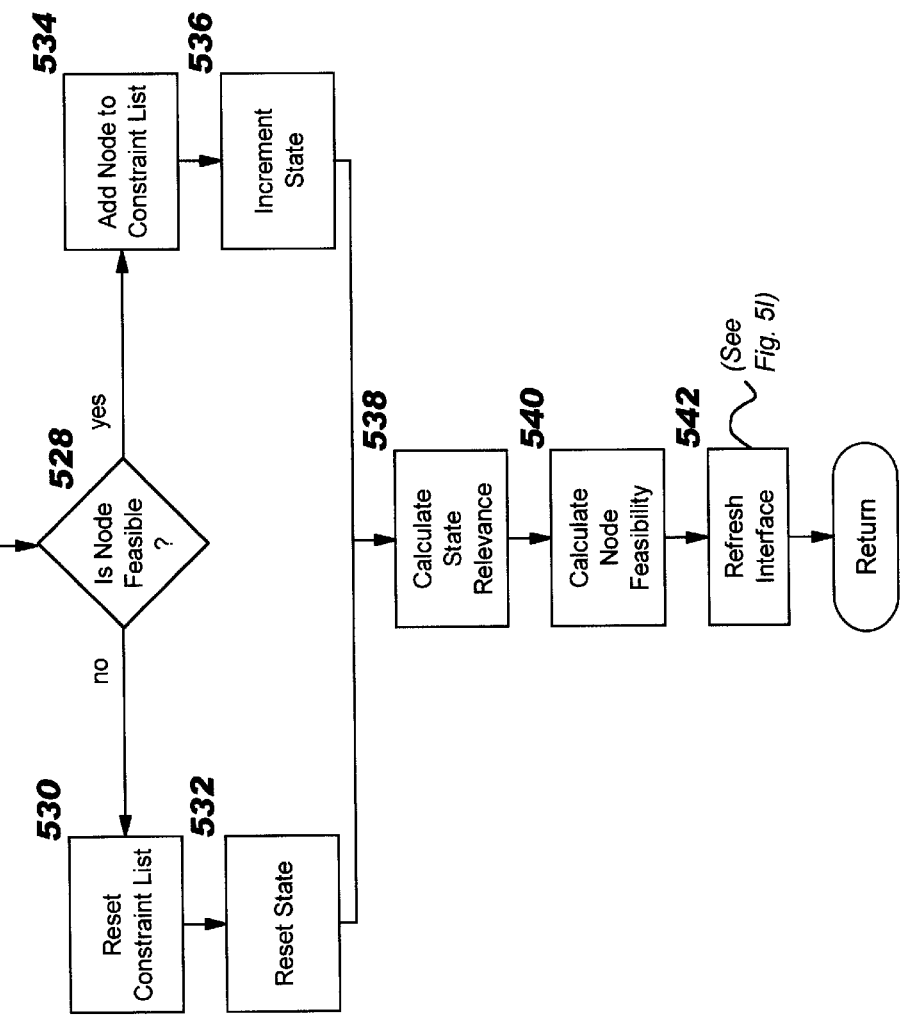

User selects an Entity

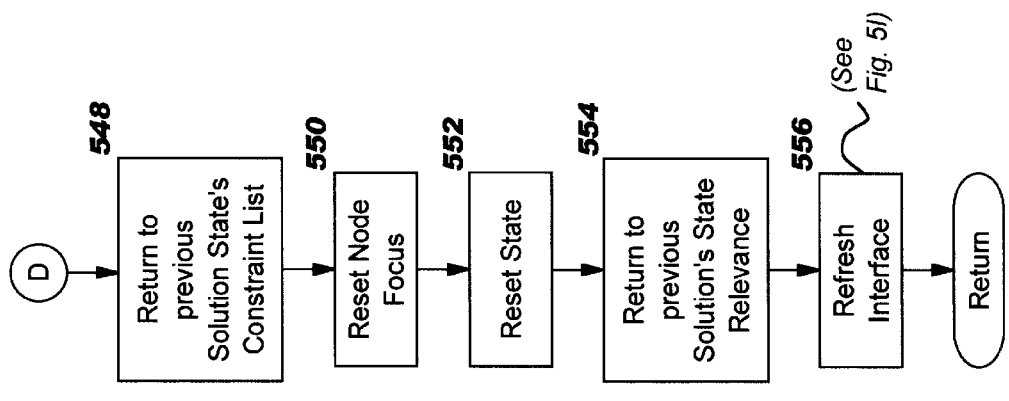

User selects Reset

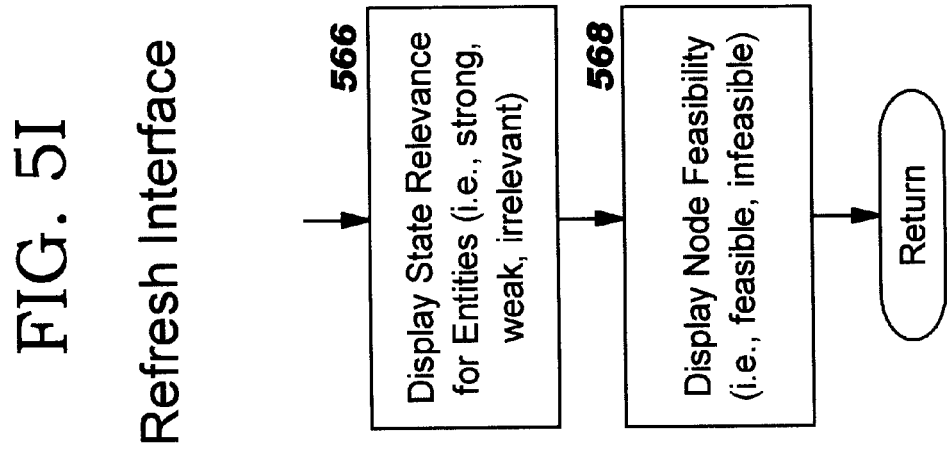

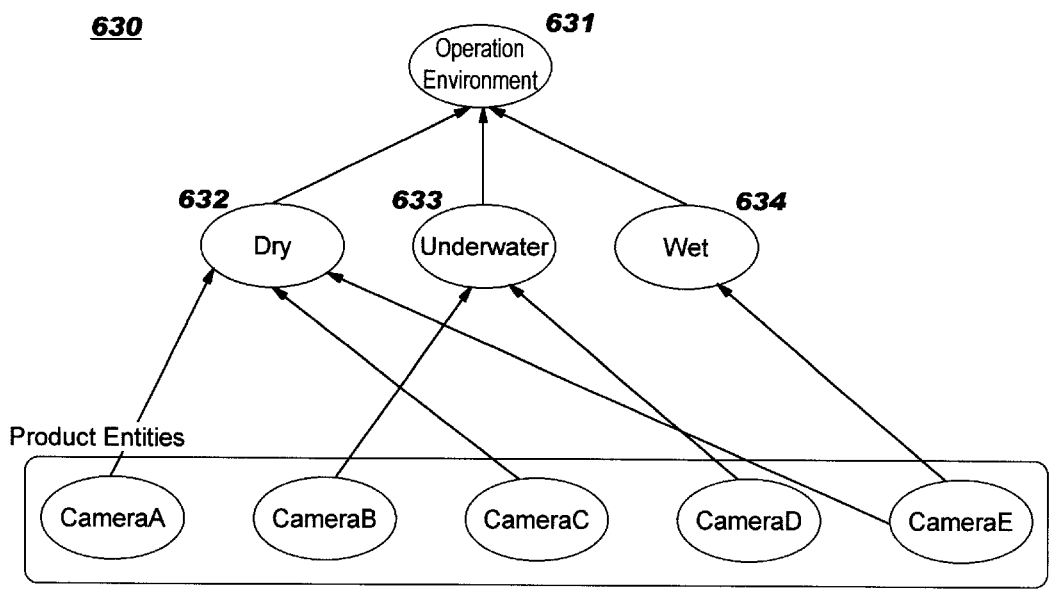
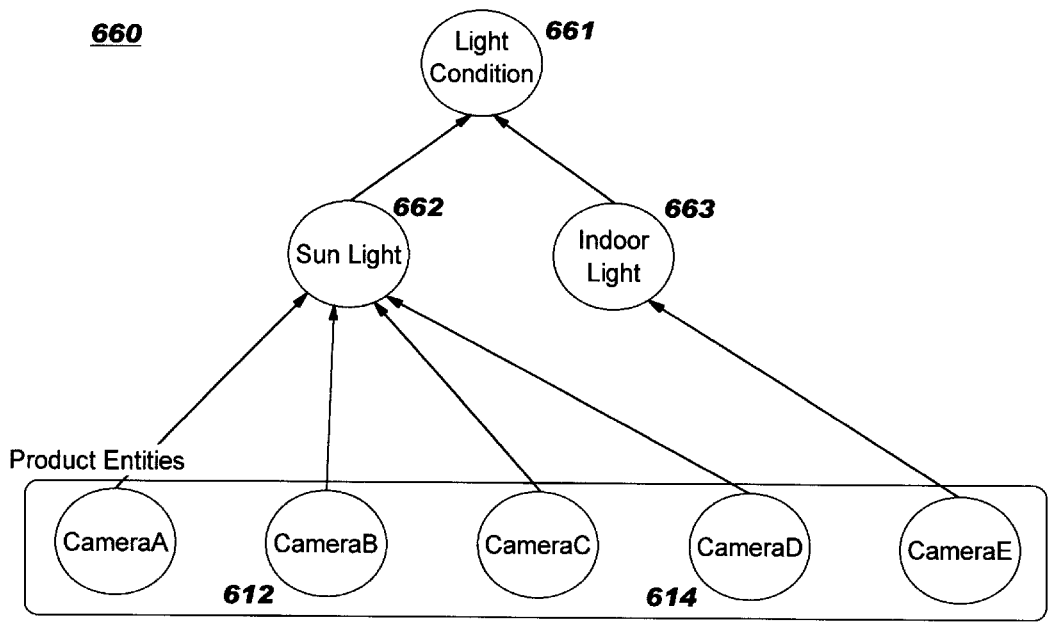

FIG. 7E

```
| Application | Operating Environment | Lighting Condition |
┌─Select an Application────────────────┐
│   ⊟    Portrait                       │
│        ⊟⊗  Self Portrait              │
│        ⊟○  Group Portrait             │
│   ⊟    Special Occasion               │
│        ⊟    Birthday   728"           │
│        ⊟⊗  Wedding                    │
│   ⊟⊗  Landscape                       │
└───────────────────────────────────────┘
┌─Product Relevance─────────────────────┐
│ ┌─Strongly Relevant Products─────────┐│
│ │  cameraC  734                      ││
│ └────────────────────────────────────┘│
│ ┌─Weakly Relevant Products───────────┐│
│ │                                    ││
│ └────────────────────────────────────┘│
│ ┌─Irrelevant Products────────────────┐│
│ │  cameraA  733                      ││
│ │  cameraB                           ││
│ │  cameraD                           ││
│ │  cameraE                           ││
│ └────────────────────────────────────┘│
└───────────────────────────────────────┘
                        [Reset] [Undo Last]
                                    735
```

```
| Application | Operating Environment | Lighting Condition |
┌─Select an Application────────────────┐
│   ⊟    Portrait                       │
│        ⊟○  Self Portrait              │
│        ⊟○  Group Portrait             │
│   ⊟○  Special Occasion                │
│        ⊟○  Birthday   728             │
│        ⊟⊗  Wedding                    │
│   ⊟⊗  Landscape                       │
└───────────────────────────────────────┘
┌─Product Relevance─────────────────────┐
│ ┌─Strongly Relevant Products─────────┐│
│ │  cameraA                           ││
│ └────────────────────────────────────┘│
│ ┌─Weakly Relevant Products───────────┐│
│ │  cameraB                           ││
│ │  cameraC                           ││
│ │  cameraD                           ││
│ └────────────────────────────────────┘│
│ ┌─Irrelevant Products────────────────┐│
│ │  cameraE                           ││
│ └────────────────────────────────────┘│
└───────────────────────────────────────┘
                        [Reset] [Undo Last]
```

FIG. 7G

736
| Operating Environment | Lighting Condition | Application |

737 — Select an Operating Environment

738 {
☐○ Underwater 739
☐○ Dry 740
☐⊗ Wet 741
}

Product Relevance
 Strongly Relevant Products
  cameraA
 Weakly Relevant Products
  cameraB
  cameraC
  cameraD
 Irrelevant Products
  cameraE

[Reset] [Undo Last]

FIG. 7H

744
| Operating Environment | Lighting Condition | Application |

Select an Operating Environment

☐   *Underwater* 739'
☐⊗ Dry 740'
☐⊗ Wet 741

Product Relevance
 Strongly Relevant Products
  cameraB
  cameraD   742
 Weakly Relevant Products Irrelevant Products
  cameraA
  cameraC   743
  cameraE

[Reset] [Undo Last]

| Lighting Condition | Application | Operating Environment |

─Select a Lighting Condition─
  ☐ ○  Sunlight      745
  ☐ ⊗  Indoor Light  746

─Product Relevance ─710─
  ─Strongly Relevant Products─
    cameraB
    cameraD
  ─Weakly Relevant Products─

─Irrelevant Products─
    cameraA
    cameraC
    cameraE

[Reset] [Undo Last]

| Lighting Condition | Application | Operating Environment |

─Select a Lighting Condition─
  ☐     *Sunlight*    745'
  ☐ ⊗   Indoor Light ─Product Relevance─
  ─Strongly Relevant Products─
    cameraB   742
    cameraD
  ─Weakly Relevant Products─

─Irrelevant Products─
    cameraA
    cameraC
    cameraE

747─[Reset] [Undo Last]

| Application | Operating Environment | Lighting Condition |

*Select an Application*
- ⊟ <u>Portrait</u>
  - ⊟ ⊗ Self Portrait
  - ⊟ ○ Group Portrait
- ⊞ ⊗ Special Occasion
- ⊟ ⊗ Landscape

*Product Relevance* 710

*Strongly Relevant Products*
- cameraA
- cameraC

*Weakly Relevant Products*

*Irrelevant Products*
- cameraB
- cameraD
- cameraE

[ Reset ] [ Undo Last ]

FIG. 7N

| Application | Operating Environment | Lighting Condition |

*Select an Application*
- ⊟ <u>Portrait</u>
  - ⊟ ⊗ Self Portrait
  - ⊟ <u>Group Portrait</u> 722'
- ⊞ ⊗ Special Occasion
- ⊟ ⊗ Landscape

*Product Relevance*

*Strongly Relevant Products* — 711
- cameraC

*Weakly Relevant Products* — 712
- cameraA

*Irrelevant Products*
- cameraB
- cameraD
- cameraE

[ Reset ] [ Undo Last ]

INTELLIGENT EXPLORATION THROUGH MULTIPLE HIERARCHIES USING ENTITY RELEVANCE

BACKGROUND OF THE INVENTION

1. Field of the Invention

The present invention relates to a computer system, and deals more particularly with a method, system, and computer readable code for improving user exploration (i.e. navigation and browsing) through hierarchies of information. Entity relevance is calculated for the entities in the hierarchies, and this information is used to guide the user in his exploration.

2. Description of the Related Art

The continuing proliferation of electronic media has resulted in an explosion in the availability of electronic catalogs, such as those used for managing parts within corporations and for selling products to consumers. Accompanying this growth is the continued investigation and implementation of different browsing strategies that offer intuitive techniques to aid users when searching and navigating large spaces of information. Providing easy-to-use facilities for the end-user is a key factor in the successful deployment of an electronic catalog, especially in today's highly competitive environment.

Categories in an electronic catalog are often arranged hierarchically, forming a category hierarchy, where the nodes of the hierarchy represent categories and sub-categories. A category hierarchy typically represents an embodiment of a particular type of association among category nodes as well as between category nodes. This association may represent: classification, decomposition, generalization, etc. For example, in a classification-based category hierarchy, a category serves to classify its sub-categories. On the other hand, in a decomposition-based category hierarchy, a category serves as a composite of parts, represented by its sub-categories. (Hereinafter, the term "category" will be used to refer to both categories and sub-categories, unless otherwise stated.) An entity (e.g., product) associated with a category represents an instance of the category, and that instance is a representative of that category.

Within an electronic catalog, the categories themselves and their arrangement to one another are engineered so as to provide intuitive navigational benefits to the catalog user in search of products. The majority of electronic catalogs in popular use today (such as those which may be created using the Net.Commerce product available from the IBM Corporation) have some category structure (i.e., node hierarchy) under which parts or products are categorized. FIG. 1A depicts a simple example of a product category hierarchy 100. The highest-level node 105, or root, of the hierarchy indicates that this is a hierarchy of computers. The next level in the hierarchy has two nodes, "Workstation" 110 and "Server" 115, where each of these nodes serves to more specifically classify different types of computers. The lowest level of the example hierarchy depicts two nodes organized under each of the Workstation and Server nodes, indicating that both of these categories have two sub-categories (120 and 125, and 130 and 135, respectively). As will be obvious, the hierarchies of actual electronic catalogs are typically much more complex, having many more levels and many more nodes at each level, than the example shown in FIG. 1A.

Use of a corporation's electronic catalogs may be limited to internal use within the corporation, or the catalogs may be designed for external use by customers. And, some electronic catalogs are used both internally and externally. An example of the internal use scenario is a catalog for parts inventory management, implemented using a bill-of-materials approach where a complex part corresponds to a high-level category, and the parts from which it is constructed then correspond to lower-level categories. An example of the external use scenario is the electronic catalogs which are becoming increasingly popular for electronic shopping using the Internet and World Wide Web (hereinafter, "Web"). These electronic catalogs appear in different forms and many different applications. Many on-line retailers offer an electronic version of their traditional printed catalog, such as those used for selling clothing, office supplies, etc. These electronic catalogs are typically organized using a category hierarchy similar to the index of the printed catalog, with which the retailer's customers are already familiar. Hierarchical categories are also commonly used for the increasingly-popular on-line auction services, where a vast array of products being offered at auction are organized into a hierarchy of categories to conveniently direct a shopper's attention to the items corresponding to his personal interest.

Electronic catalogs typically provide some form of search or navigation capability that users can employ in the location of parts or products. Search capabilities include entry of a specific item number, and keyword searches. Using this approach, a user may view a part or product directly, without regard to how it has been categorized. For example, if a user enters an item number corresponding to a particular model of desktop computer, he may be unaware that it has been categorized as a desktop computer, which is a type of workstation, which is a type of computer (using the example of FIG. 1A). However, the absence of the categorization information is a drawback of this approach. Suppose, for example, that the user has incorrectly recorded the item number: an item number search will not enable him to locate the product he is interested in. Keyword searches can also be problematic, where complex Boolean relationships between keywords may be needed in order to successfully locate a specific product. Entering too few keywords may result in an overly broad and therefore unusable result, while entering too many may cause relevant products to be omitted. Without information about the category hierarchy, the user may not be able to easily refine his keyword search to use an appropriate set of keywords.

Categories may also be navigated in a hierarchical manner as the user looks for a part or product, or browsed hierarchically. Electronic catalogs employing catalog hierarchies are nearly always accompanied by some form of hierarchical navigation mechanism. Hierarchical navigation allows users to incrementally ascend and descend from node to node along the paths defining the hierarchy. Hierarchical navigation offers an alternative to search in the location of parts or products in an electronic catalog, essentially providing a roadmap through a catalog's information space where the user can view relationships among categories as he moves from node to node. If there are multiple hierarchies in the catalog, a user is given the opportunity to move to another hierarchy by selecting that hierarchy's root node and subsequently navigating from that point.

FIG. 1B depicts the example category hierarchy of FIG. 1A, which has now been augmented with instances of several of the categories. These instances are specific products (types of computers, in this example), and are collectively referred to as the "product base", denoted in FIG. 1B by element 150. Instances in the general case (i.e. whether they are parts, products, etc.) within a hierarchy will be referred to hereinafter as "entities", and the collection of entities will be referred to as the "entity base". The user may hierarchically navigate this product categorization, for example, by beginning at the root node 105, where he learns from the hierarchical structure 100 that the computers in this catalog are further organized into workstations and servers. Suppose the user is interested in a laptop computer. He will therefore select to navigate to the Workstation node 110 instead of to the Server node 115. By his intuitive knowledge of computer descriptions, the user then realizes that the "Portable" category 125 is the next logical node for descending the hierarchy to find a laptop computer. Having reached a collection of entities 151, 152, 153, the user may then choose to view detailed information about the particular computer instances. The user may also choose to ascend the hierarchy, perhaps to view desktop computers as an alternative to portable computers, in which case he will navigate to (i.e. ascend to) the Workstation node 110 and then descend to the Desktop node 120.

Hierarchical browsing, in addition to allowing incremental descents and ascents of hierarchical navigation, allows users to make non-incremental descents and ascents in a hierarchy. It also enables users to make lateral movements across nodes within a hierarchy. In addition, when browsing multiple hierarchies, users are allowed to move to another hierarchy without having to continue their search from the new hierarchy's root node. Referring to the example of FIG. 1B, hierarchical browsing would enable the user to traverse from the root node 105 directly to a lower-level node such as Desktop 120, and to move laterally from that node to another node such as Server 115 or Office Server 135.

A number of problems and inadequacies exist with current hierarchical navigation and hierarchical browsing capabilities. With reference to hierarchical navigation, these include: the limitation of using incremental descent and ascent for traversal; inability to make lateral movements within a hierarchy, or across multiple hierarchies; and the limitation of considering a single hierarchy at a time. With reference to hierarchical browsing, the inadequacies include that hierarchical browsing does not maintain a solution state—that is, which nodes have been selected/visited by the user. A solution state enables use of visited nodes as constraints in narrowing the user's search for an entity. In effect, each subsequent visited node "prunes" the information space being traversed, such that these constraints serve as a boundary for the set of entities that may satisfy the user's interest. Further, because hierarchical browsing does not maintain a solution state, a search strategy limited to this technique cannot reason about consistency between the constraints of the current solution state and the lateral nodes in a hierarchy (or across hierarchies). And, because hierarchical browsing cannot reason about consistency between the constraints of the current solution state and the lateral nodes in a hierarchy or across hierarchies, it is incapable of offering any guidance to a user as to which paths in the hierarchy lead to entities that remain consistent with his on-going search for a part or product.

Accordingly, a need exists for a technique by which these inadequacies in hierarchical navigation and hierarchical browsing can be overcome, in order to provide more intelligent and intuitive exploration through hierarchical information.

SUMMARY OF THE INVENTION

An object of the present invention is to provide a technique to improve exploration of category hierarchies.

Another object of the present invention is to provide a technique for improving user satisfaction with electronic catalogs.

It is a further object of the present invention to provide these techniques without requiring alteration of existing category hierarchies and/or electronic catalogs.

It is another object of the present invention to provide guidance for a user traversing a category hierarchy as to where entities that are relevant to an on-going search may be located.

It is yet another object of the present invention to provide guidance to a user as to which next node choices for paths through a category hierarchy remain consistent with his on-going search, and which are inconsistent.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for use in a computing environment, for intelligent and improved exploration through one or more hierarchies of categorized information. In a first aspect, this technique comprises: providing one or more category hierarchies, where each of the hierarchies comprises a root node, one or more intermediate nodes, and one or more leaf nodes. Each of the root nodes and the intermediate nodes corresponds to a category in the hierarchy, and each of the leaf nodes corresponds to an entity categorized by said hierarchy. This first aspect further comprises: computing a structural relevance for each of the root nodes and the intermediate nodes; enabling a user to select a particular one of the root nodes or the intermediate nodes; computing a state relevance reflecting this selection; and computing a node feasibility reflecting this state relevance.

Computing the structural relevance preferably further comprises: determining a static set of strongly relevant, weakly relevant, irrelevant, and relevant ones of the entities for each of the root nodes and the intermediate nodes. Computing the state relevance preferably further comprises: determining a dynamic set of strongly relevant, weakly relevant, irrelevant, and relevant ones of the entities based upon a previous state of the dynamic set and the static set for the selected node.

Computing the node feasibility preferably further comprises: determining a feasible or non-feasible status of each of the root nodes and the intermediate nodes which have not yet been selected. This may further comprise: determining the status to be feasible when the static set of relevant ones for the selected node has at least one entity in common with the dynamic set of relevant ones, and determining the status to be infeasible otherwise.

The present invention will now be described with reference to the following drawings, in which like reference numbers denote the same element throughout.

BRIEF DESCRIPTION OF THE DRAWINGS

FIGS. 5A through 5I illustrate flow charts which set forth the logic which may be used to implement the preferred embodiment of the present invention;

FIGS. 6A through 6C depict alternative category hierarchies over a single set of exemplary products.

DESCRIPTION OF THE PREFERRED EMBODIMENT

Figure 2:
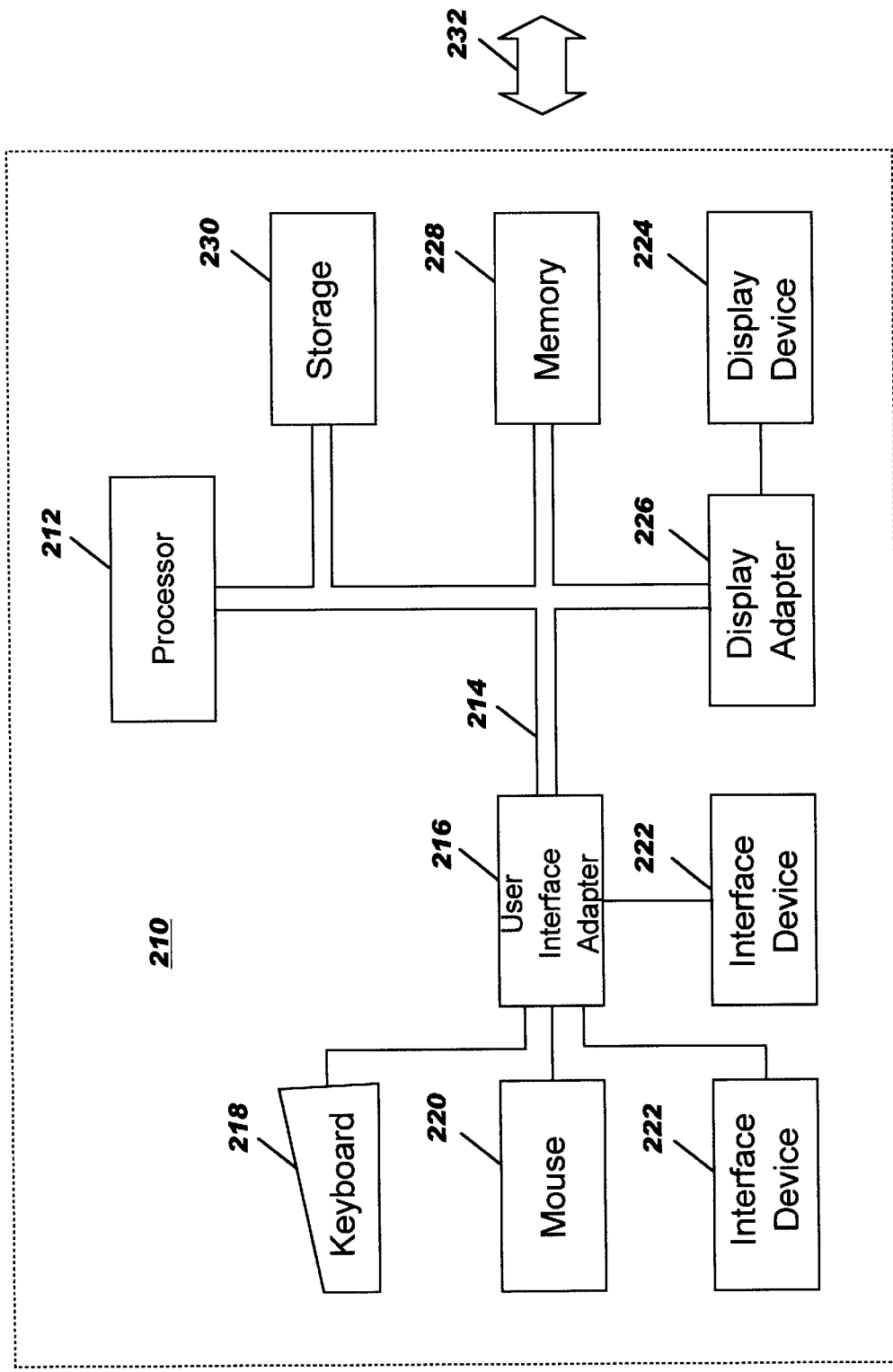
FIG. 2 is a block diagram of a computer workstation environment in which the present invention may be practiced.

FIG. 2 illustrates a representative workstation hardware environment in which the present invention may be practiced. The environment of FIG. 2 comprises a representative single user computer workstation 210, such as a personal computer, including related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a CDPD (cellular digital packet data) card. The workstation 210 may be associated with such other computers in a local area network (LAN) or a wide area network (WAN), or the workstation 210 can be a client in a client/server arrangement with another computer, etc. All of these configurations, as well as the appropriate communications hardware and software, are known in the art.

Figure 3:
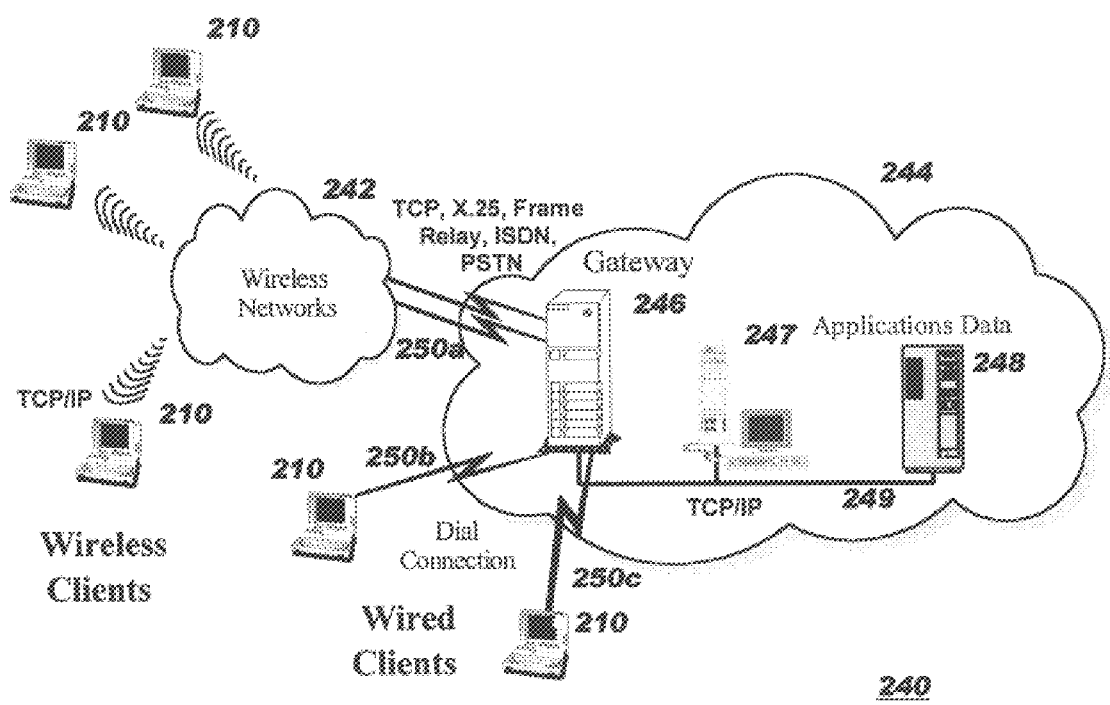
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 242 and 244 may also include mainframe computers or servers, such as a gateway computer 246 or application server 247 (which may access a data repository 248 ). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, 250c. The gateway computer 246 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 246 may also be coupled 249 to a storage device (such as data repository 248). Further, the gateway 246 may be directly or indirectly coupled to one or more workstations 210.

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in New York. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250 a such as TCP or UDP (User Datagram Protocol) over IP, X.25, Frame Relay, ISDN (Integrated Services Digital Network), PSTN (Public Switched Telephone Network), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 of the workstation 210 or server 247 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein.

When the present invention is used in a client-server networking environment, a client computer on which the present invention operates may be connected to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The client computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the client computer will be referred to equivalently as a "workstation", "machine", "device", or "computer", and use of any of these terms or the term "server" refers to any of the types of computing devices described above.

In the preferred embodiment, the present invention is implemented as one or more modules (also referred to as code subroutines, or "objects" in object-oriented programming) of a computer software program (or programs) which provides exploration capabilities for a category hierarchy. This program is referred to herein as an "exploration engine". Typically, the exploration engine will be used with electronic catalogs of information. The information in these catalogs may pertain to products, parts, or other entities. The categories used to organize these entities may correspond to chapters of a book, departments within a retail store, or any other type of hierarchical association. The invention may be used with electronic information in an Internet environment. Alternatively, the environment may be a corporate intranet, an extranet, or any other network environment. Or, the present invention may be used in a stand-alone environment, such as where a user interacts with an electronic catalog stored on a storage medium directly accessible from his desktop computer. The program code of the preferred embodiment may be implemented as objects in an object-oriented programming language, or in a conventional procedurally-oriented language, or in a mix of object-oriented and procedural language code. When used in a networking environment, the code of the present invention preferably operates on the server. Alternatively, the code of the present invention may operate partially on a server and partially on the client machine (for example, by pre-computing structural information on a server, and then downloading this information to the client machine for use with the dynamic exploration techniques that will be described).

A number of definitions will now be provided for terms that will be used in describing the present invention.

node hierarchy: A tree-like structure where the top node represents the root and the bottom nodes represent the leaf nodes. Intermediate nodes have parent nodes and children nodes.

hierarchical navigation: Incremental descent downward, or ascent upward, in a node hierarchy.

hierarchical browsing: Refers to lateral movement across a node hierarchy and non-incremental descents or ascents in a node hierarchy, as well as movement between hierarchies.

node-based forward-checking: Forward-checking is a consistency maintenance mechanism that consists of pruning inconsistent portions of a node hierarchy (that is, portions inconsistent with the solution space) in an a priori manner. Node-based forward-checking represents the application of this technique within the context of hierarchical node navigation and browsing, which when implemented dynamically displays: (1) eligible hierarchical paths for which entities exist that are consistent with the current solution (i.e., with the past hierarchical node selections); and (2) pruned hierarchical paths for which no entities exist that satisfy the current solution.

entities: Represent instances of nodes (e.g., specific products, parts, etc.).

entity relevance: Represents how directly or specifically an entity is related to a particular node in a hierarchy.

strongly relevant entity: An entity that directly and specifically relates to a particular node in a hierarchy.

weakly relevant entity: An entity that indirectly and generally relates to a particular node in a hierarchy. Such an entity would be strongly relevant to some descendant or ancestor node of the current node.

irrelevant entity: An entity that is neither directly nor indirectly related to a particular node in a hierarchy. Such an entity would be directly and specifically related to a sibling node or to a sibling of a descendent or ancestor node of the current node, and would not be strongly or weakly relevant to the current node.

feasible space: That subset of the information space which contains entities that are feasible for (i.e. consistent with) the user's interest as expressed by his current exploration strategy.

intelligent hierarchical exploration: Utilizes entity relevance combined with node-based forward checking to browse and navigate node hierarchies.

The present invention addresses the inadequacies of hierarchical navigation and browsing by combining entity relevance with node-based forward-checking to implement an intelligent hierarchical exploration scheme. This scheme can be enabled over a multitude of hierarchies and their node instances.

More specifically, entity relevance (strongly-relevant, weakly-relevant, and irrelevant) is first calculated for each node in a particular hierarchy (i.e., classification hierarchy, abstraction hierarchy, decompositional hierarchy, etc.) based on the existence of associations between a node (including its ancestor and descendent nodes) and any entities. This is referred to herein as "structural relevance". Second, entity relevance is calculated for the current state of the solution, where the solution state is based upon the previously visited nodes and the current node. This is referred to herein as "state relevance". Third, entity relevance is combined with node-based forward-checking to provide a hierarchical exploration scheme to guide a user's exploration over multiple node hierarchies and their entities.

Figure 1A:
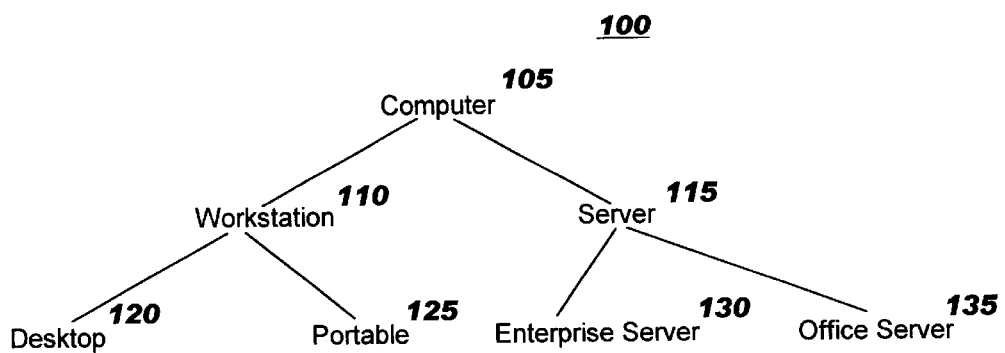
FIGS. 1A and 1B depict a simple example of a product category hierarchy, and an augmentation of this hierarchy with particular products.
Figure 1B:
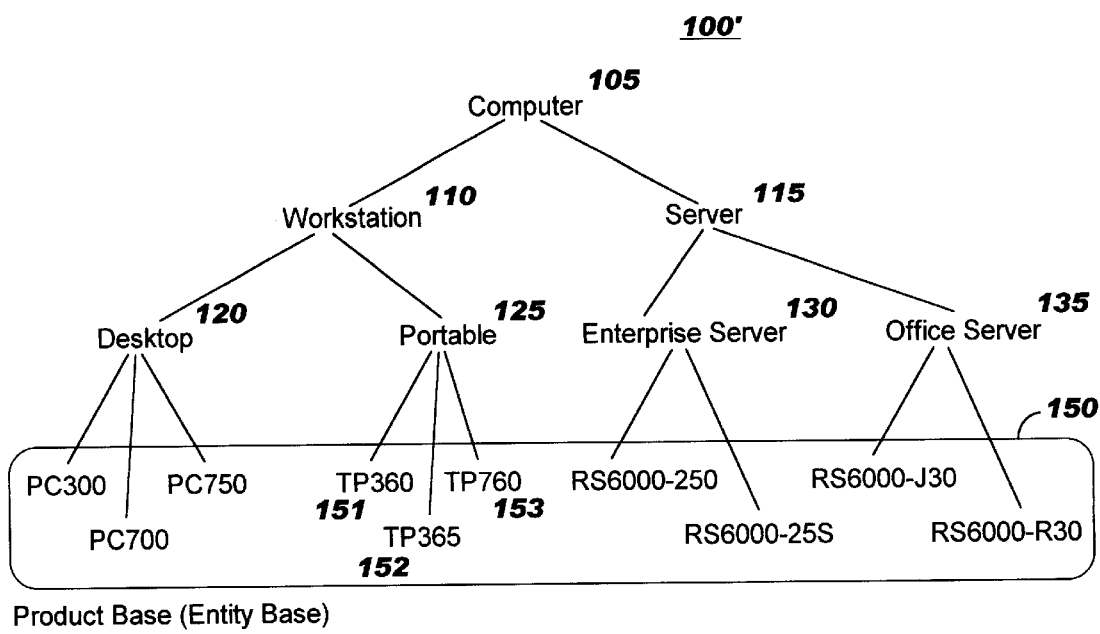

This solution is based on the prior creation of two necessary pieces of information, both of which are commonly available in any electronic catalog system (e.g., a catalog created using IBM's Net.Commerce product). First, a hierarchy of nodes that serves to categorize entities is required. This structure will be organized as a hierarchy of category nodes. The shape of this hierarchy (that is, the number of levels and the number of nodes per level) will vary among particular electronic catalogs, depending upon the type of information represented by the catalog. As previously stated, examples of node hierarchies include book chapters, store departments, and other classifications, such as the example product categorization structure shown in FIG. 1A. Second, a base of entities is required, where the entities are instances of the category nodes. In most electronic catalogs, this base of entities comprises a base of products or parts, such as that illustrated in the example of FIG. 1B.

Creating a catalog hierarchy and product information for the hierarchy often requires a significant amount of time and effort, even when using an efficient catalog creation system. A key advantage associated with the present invention is its ability to utilize existing category node hierarchies from which to enable an intelligent hierarchical exploration scheme, making it readily usable without requiring rework to either the product information or the categorization structure which has already been created.

Given the existence and accessibility of the hierarchy of category nodes and the entity base, the following discussion explains how this invention facilitates and implements intelligent hierarchical exploration. (Note that in the text discussions which follow, the word "node" is used as a shorthand reference for "category node".)

Overview of Invention

The present invention uses entity relevance to guide users in the exploration of node hierarchies in the search for entities (i.e., products, parts, etc.). Two forms of entity relevance are used: structural relevance and state relevance. Structural relevance is entity relevance to a hierarchical node that is defined by the structural associations that exist between the hierarchical node and the entities. State relevance, on the other hand, is entity relevance that is defined by the current state of the solution. The state of the solution is comprised of the entities and their relevance, given the hierarchical nodes a user has previously visited and is currently visiting. The present invention uses structural relevance to calculate state relevance as a user moves from one node to another node in the hierarchy, or between hierarchies. State relevance is also used with structural relevance to determine the hierarchical nodes that represent the feasible and infeasible paths (nodes) from the current node. The feasible paths are those to which a user may navigate and still remain consistent with the past solution state. Note that the user's selection of a node acts as a constraint contributing to the boundary of the feasible space, where this boundary outlines the eligible entities that reside in the feasible space.

The preferred embodiment of the present invention will now be discussed in more detail with reference to FIGS. 4 through 7. The novel techniques of the present invention for computing entity relevance will be described first, in terms of the formulas and algorithm used for the various computations. This description is followed by an example which shows how the computations are applied to a specific node hierarchy (represented in FIG. 4). Flowcharts (FIGS. 5A through 5I) which may be used to implement the preferred embodiment are then described. Finally, an example is provided which illustrates several exploration paths through multiple hierarchies over a set of products (shown in FIGS. 6A through 6C), along with representative graphical user interface displays (FIGS. 7A through 7N) that may be provided to a user as he moves along these exploration paths.

Calculating Structural Relevance

Before hierarchical exploration can be enabled, it is necessary that the exploration engine have access to the structural relevance of each entity (i.e., product, part, etc.) for each node in the hierarchy. Structural relevance may be calculated in an a priori or in a dynamic manner. The decision as to when this information is calculated amounts to the familiar struggle of whether to trade-off space for speed or speed for space. In the preferred embodiment, the authors of the present invention choose to trade-off space for speed. Consequently, the following descriptions refer to calculating and storing structural relevance before exploration begins, in order to allow the exploration engine quick access to relevance information. However, in an alternative embodiment, structural relevance may be computed dynamically as exploration proceeds. In this alternative approach, storage requirements are reduced because the structural relevance for the entire hierarchy does not need to remain stored. (Note that because the decision of which trade-off to make is an implementation detail, either implementation is reflective of the essence of this invention.)

The following nomenclature is defined for structural relevance computations:

| | |
|---|---|
| i,k | - node i, in hierarchy k |
| E | = {Entities occurring in all hierarchies} |
| $E_{i,k}$ | = {Relevant Entities for node i in hierarchy k} |
| $S_{i,k}$ | = {Strongly Relevant Entities for node i in hierarchy k} |
| $I_{i,k}$ | = {Irrelevant Entities for node i in hierarchy k} |
| $W_{i,k}$ | = {Weakly Relevant Entities for node i in hierarchy k} |
| $_{j \in J}S_{i,j,k}$ | = {Strongly Relevant Entities for Ancestor Nodes: for all j ∈ J, where J is the number of ancestors of node i in hierarchy k} |
| $_{l \in L}S_{i,l,k}$ | = {Strongly Relevant Entities for Descendant Nodes: for all l ∈ L, where L is the number of descendants of node i in hierarchy k} |

Structural entity relevance is calculated for each node, i, in each particular hierarchy, k, using the following formulas:

$S_{i,k}$=children of node i that are entities (i.e. instances of node i)

$W_{i,k} =\,_{l \in L}S_{i,1,k} \cup\,_{j \in J}S_{i,j,k}$ $I_{i,k}=E-S_{i,k}-W_{i,k}$ $E_{i,k}=S_{i,k} \cup W_{i,k}$ As can be seen by inspection, these formulas indicate the following: first, children which are entities (i.e. instances) are strongly relevant by definition, second, weakly relevant entities are those which are either strongly relevant to a descendant node or strongly relevant to an ancestor node; third, irrelevant entities are those that are neither strongly relevant nor weakly relevant; and finally, relevant entities are those that are either strongly relevant or weakly relevant.

Note that the set of weakly relevant entities are made up of the following: first, the entities that are instances of descendant nodes in the hierarchy, and second, the entities that are instances of ancestor nodes. The first set of entities (i.e. instances of descendants), with respect to the node focus of a particular node, represents weakly relevant entities that are further specialized because they occur at a more detailed level of the node hierarchy. The second set of entities (i.e. instances of ancestors) represents weakly relevant entities that are more generalized,

Calculating State Relevance

During hierarchical exploration, a user navigates from one node to another. In order to guide the user, the exploration engine must either dynamically calculate or have access to the state relevance of each entity for the "current", navigated-to node; this is based on the state relevance for the "previous", navigated-from node. In the preferred embodiment, the state relevance is dynamically calculated by the exploration engine. Alternatively, this information may be calculated by one or more utility modules which are invoked by, and make their result accessible to, the exploration engine.

The following additional nomenclature is defined for state relevance computations:

s—state identifier $E_s$={Relevant Entities for solution state s}
$S_s$={Strongly Relevant Entities for solution state s}
$I_s$={Irrelevant Entities for solution state s}
$W_s$={Weakly Relevant Entities for solution state s}

The state relevance for an initial state is computed using the following formulas:

$$S_{s=1} = S_{i,k}$$

$$W_{s=1} = W_{i,k}$$

$$I_{s=1} = I_{i,k}$$

$$E_{s=1} = S_{s=1} \cup W_{s=1}$$

As can be seen by inspection, these formulas indicate the following: the strongly relevant entities for an initial state are all the strongly relevant entities of a particular node; the weakly relevant, and the irrelevant, entities for an initial state are all the weakly relevant and all the irrelevant entities, respectively, of a particular node; and the relevant entities for an initial state are those entities which are either strongly relevant or weakly relevant entities for this initial state.

The state relevance for subsequent states is computed using the following formulas:

$$S_{s=s+1} = (S_s \cup W_s) \cap S_{i,k}$$

$$W_{s=s+1} = (S_s \cup W_s) \cap W_{i,k}$$

$$I_{s=s+1} = I_s \cup I_{i,k}$$

$$E_{s=s+1} = S_{s=s+1} \cup W_{s=s+1}$$

These formulas indicate that: the strongly relevant entities for a given state are all the strongly relevant entities and all the weakly relevant entities of the prior state, which are also strongly relevant for the current node; the weakly relevant entities for a given state are all the strongly relevant entities and all the weakly relevant entities of the prior state, which are also weakly relevant for the current node; the irrelevant entities for a given state are all the irrelevant entities of the prior state, as well as those entities which are irrelevant for the current node; and the relevant entities at a given state are those entities which are either strongly relevant or weakly relevant for this given state.

Calculating Node Feasibility

Node-based forward checking is based upon whether or not a node represents a feasible selection, given the current state of the solution. Consequently, node feasibility is calculated during hierarchical exploration as a user navigates from one node to another. It is this act that is referred to as forward-checking, and which subsequently serves as guidance to the user as to what paths (nodes) in the hierarchies are feasible or infeasible (given the current solution state). Node feasibility is calculated using both structural relevance and state relevance.

The following additional nomenclature is defined for node feasibility computations:

C=[nodes that constrain the solution space (i.e., previously visited nodes that are mutually consistent)]

Node feasibility is computed according to the following algorithm:
For each hierarchy k,
  For each node i, where i∉C
    If $E_{i,k} \cap E_s \neq \emptyset$ Then node i is a Feasible Node
      Else If $E_{i,k} \cap E_s = \emptyset$ Then node i is an Infeasible Node In other words, the structural relevance of each node that has not been previously visited is used, along with the current state relevance, to determine whether the node is a feasible choice. As indicated by the algorithm, a node is feasible for a particular state if the intersection of its structurally relevant entities with its relevant entities for this state is not null. The node is infeasible if none of its structurally relevant entities are relevant in the particular state.

Note that node feasibility is calculated with each node selection the user makes (i.e., selection of a descendent node or a lateral node, or a node in a different hierarchy), in order to further prune the problem space.

Exploration continues when the user either selects a feasible node or an infeasible node. Upon selection of a feasible node, this node is added to the nodes contained in list C. Upon selection of an infeasible node, the nodes contained in the list C are removed and the newly selected node becomes the only node in the list C.

Example of Calculating Entity Relevance and Node Feasibility

Figure 4:
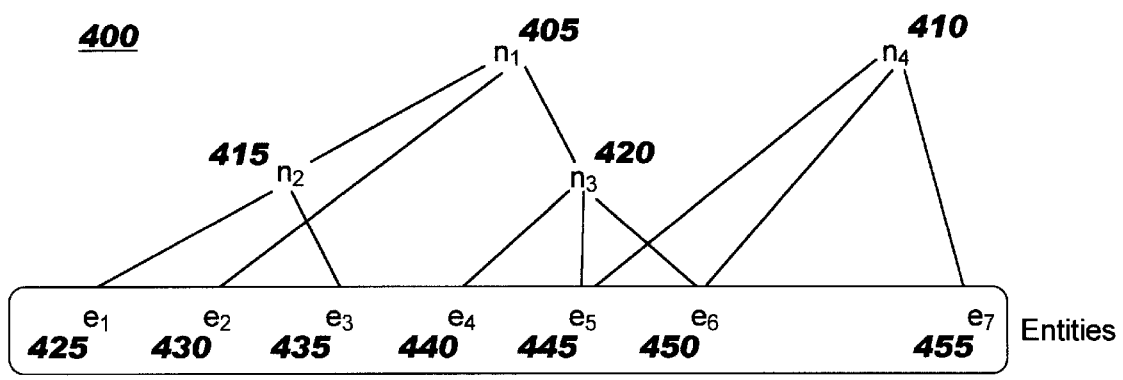
FIG. 4 depicts a sample node hierarchy with entities, which is used to explain the techniques of the present invention.

A sample node hierarchy 400 is represented abstractly in FIG. 4, where hierarchy nodes are denoted as $n_1$ through $n_4$ and entities are denoted as $e_1$ through $e_7$. Note that there are two hierarchies in FIG. 4, one with root node $n_1$ (element 405) and one with root node $n_4$ (element 410).

The entity relevance computations of the present invention will now be demonstrated with respect to this sample hierarchy 400. Structural relevance is computed first, using the previously-defined formulas. (Note that as previously stated, this computation of structural relevance is performed before a user begins exploring the hierarchy, according to the preferred embodiment.) Next, state relevance is computed, again using the previously-defined formulas. Finally, node feasibility is computed using the previously-defined algorithm.

The structural relevance computations are shown below, where the structural entity relevance for each node in each of the hierarchies is computed. The computations are explained with reference to the first node, chosen as $n_1$ (element 405). Computations for the remaining nodes are shown but are not explained in detail, except where new features are involved. (It will be obvious to one of skill in the art that the computations for the remaining nodes are analogous.)

First, the set E is determined, where E is simply all the entities:

$$E = \{e_1, e_2, e_3, e_4, e_5, e_6, e_7\}$$

For the root node $n_1$ (where i=1), $S_{i,1}$, $I_{i,1}$, $W_{i,1}$, and $E_{i,1}$ are calculated as follows:

$$S_{1,1} = \{e_2\}$$

$$W_{1,1} = \{(e_1, e_3, e_4, e_5, e_6\} \cup \emptyset = \{e_1, e_3, e_4, e_5, e_6\}$$

$$I_{1,1} = \{e_1, e_2, e_3, e_4, e_5, e_6, e_7\} - \{e_2\} - \{e_1, e_3, e_4, e_5, e_6\} = \{e_7\}$$

$$E_{1,1} = \{e_2\} \cup \{e_1, e_3, e_4, e_5, e_6\} = \{e_1, e_2, e_3, e_5, e_4, e_6\}$$

These expressions show first that the strongly-relevant entity for node $n_1$ (element 405) is its child which is an entity, $e_2$ (element 430), as can be seen by reference to FIG. 4.

Secondly, the weakly-relevant entities for node $n_1$ are computed by determining all the entities that are strongly relevant to descendent nodes of $n_1$, which is the set $\{e_1, e_3, e_4, e_5, e_6\}$, and then adding this (i.e. with a union operation) to the set of entities that is strongly relevant to ancestor nodes of $n_1$. Since $n_1$ is a root node, it has no ancestors. Thus, the weakly-relevant entities are determined to be $\{e_1$, $e_3$, $e_4$, $e_5$, $e_6$}. With reference to FIG. 4, it can be seen that these are the elements 425, 435, 440, 445, and 450, representing all the entities which can be reached by traversing through the node $n_1$, other than its direct child entity (i.e. instance) 430.

The irrelevant entities for node $n_1$ are computed next, by subtracting from the set of all entities E those entities which are strongly relevant and those which are weakly relevant. The result is the entity $e_7$, and as seen at element 455 in FIG. 4, this is an entity which cannot be reached by traversing a path from node $n_1$ (405).

Finally, the set of relevant entities for node $n_1$ is computed, where this set is the union of the strongly relevant and the weakly relevant entities, and is the set $\{e_1, e_2, e_3, e_4, e_5, e_6\}$.

For the next node $n_2$ (where=2), $S_{i,1}$, $I_{i,1}$, $W_{i,1}$, and $E_{i,1}$ are calculated as follows:

$$S_{2,1}=\{e_1, e_3\}$$

$$W_{2,1}=\emptyset \cup \{e_2\}=\{e_2\}$$

$$I_{2,1}=\{e_1, e_2, e_3, e_4, e_5, e_6, e_7\}-\{e_1, e_3\}-\{e_2\}=\{e_4, e_5, e_6, e_7\}$$

$$E_{2,1}=\{e_1, e_3\}\cup\{e_2\}=\{e_1, e_2, e_3\}$$

These expressions show that the strongly relevant entities for this node $n_2$ (element 415) are its children (instances) $e_1$ and $e_3$, as shown at 425 and 435 of FIG. 4, and that the weakly relevant entity is $e_2$ (430), which was strongly relevant to $n_2$'s ancestor node $n_1$ (405). The relevant entities are therefore $\{e_1, e_2, e_3\}$. All other entities $\{e_4, e_5, e_6, e_7\}$ are irrelevant.

For the next node $n_3$ (where i=3), $S_{i,1}$, $I_{i,1}$, $W_{i,1}$ and $E_{i,1}$ are calculated as follows:

$$S_{3,1}=\{e_4, e_5, e_6\}$$

$$W_{3,1}=\emptyset\cup\{e_2\}=\{e_2\}$$

$$I_{3,1}=\{e_1, e_2, e_3, e_4, e_5, e_6, e_7\}-\{e_4, e_5, e_6\}-\{e_2\}=\{e_1, e_3, e_7\}$$

$$E_{3,1}=\{e_4, e_5, e_6\}\cup\{e_2\}=\{e_2, e_4, e_5, e_6\}$$

For the root node $n_4$ (410) of the second hierarchy of FIG. 4 (where i=4 and k=2), $S_{i,2}$, $I_{i,2}$, $W_{i,2}$ and $E_{i,2}$ are calculated as follows:

$$S_{4,2}=\{e_5, e_6, e_7\}$$

$$W_{4,2}=\emptyset\cup\emptyset=\emptyset$$

$$I_{4,2}=\{e_1, e_2, e_3, e_4, e_5, e_6, e_7\}-\{e_5, e_6, e_7\}-\emptyset=\{e_1, e_2, e_3, e_4\}$$

$$E_{4,2}=\{e_5, e_6, e_7\}\cup\emptyset=\{e_5, e_6, e_7\}$$

The state relevance and node feasibility computations are shown below, in terms of an example of a user navigating through the node hierarchies of FIG. 4.

Note that the user initially has available to him four node possibilities for selection: $n_1$, $n_2$, $n_3$, $n_4$. Assume that the user elects to begin exploration of the hierarchy by selecting node $n_1$, thereby setting the node focus. Using the previously-defined formulas for initialization of state relevance, and the calculated structural relevance for entities at $n_1$ (see above), the state of the solution for state s=1 is initialized as follows:

$$S_{s=1}=S_{1,1}=\{e_2\}$$

$$W_{s=1}=W_{1,1}=\{e_1, e_3, e_4, e_5, e_6\}$$

$$I_{s=1}=I_{1,1}=\{e_7\}$$

$$E_{s=1}=\{e_2\}\cup\{e_1, e_3, e_4, e_5, e_6\}=\{e_1, e_2, e_3, e_4, e_5, e_6\}$$

Note that the strongly relevant, weakly relevant, and irrelevant entities for this initial state ($S_{s=1}$, $W_{s=1}$, and $I_{s=1}$, respectively) are simply initialized to the results determined for this node $n_1$ during the structural relevance calculations process. The relevant entities for the initial state ($E_{s=1}$) are then the union of the strongly relevant and weakly relevant entities.

Having calculated the current state of the solution, it is now possible to calculate the node feasibility for the remaining nodes using the algorithm for node feasibility. Since the only node the user has selected thus far is $n_1$, the list C contains only this node:

$$C=[n_1]$$

First the node feasibility for hierarchy k=1 (i.e. having root node $n_1$ in FIG. 4) is computed for this hierarchy's nodes $n_2$ and $n_3$, because neither of those is an element of the list in C. The first formula of the feasibility algorithm is applicable to node $n_2$, as follows:

$$[E_{i,k}=\{e_1, e_2, e_3\}]\cap[E_s=\{e_1, e_2, e_3, e_4, e_5, e_6\}]\neq\emptyset,$$

since this yields the result $\{e_1, e_2, e_3\}$. Therefore, the node $n_2$ is feasible for this state—that is, traversing from the current node $n_1$ to the node $n_2$ would be feasible or consistent with the current solution state in that relevant entities would still exist in the new solution set. (Note that the first part of this formula, $E_{i,k}$, was determined during the structural relevance computations as those entities which are relevant for the node $n_2$. The second part of the formula, $E_s$, was calculated as the relevant entities for this state in the state relevance computations.)

Applying this formula next to node $n_3$, we have:

$$[E_{i,k=\{e2}, e_4, e_5, e_6\}]\cap[E_s=\{e_1, e_2, e_3, e_4, e_5, e_6\}]\neq\emptyset,$$

since the result of this expression is ($e_2$, $e_4$, $e_5$, $e_6$). Therefore, the node $n_3$ is also a feasible node to select from the current node $n_1$.

Having finished the feasibility computations for the first hierarchy, the node feasibility for hierarchy k=2 (i.e. having root node $n_4$ in FIG. 4) is then computed. This hierarchy has only the single node $n_4$, as shown at 410. Since this node is not an element of the list in C, the feasibility algorithm for node $n_4$ is computed. The first formula of the algorithm is applicable:

$$[E_{i,k}=\{e_5, e_6, e_7\}]\cap[E_s=\{e_1, e_2, e_3, e_4, e_5, e_6\}]\neq\emptyset,$$

since this expression evaluates to the result $\{e_5, e_6\}$. Thus, the node $n_4$ is another feasible choice from current node $n_1$: the entities $e_5$ and $e_6$ (elements 445 and 450 of FIG. 4) are common to the hierarchies of both these root nodes, and traversing from root node $n_1$ to root node $n_4$ would therefore not yield an empty solution state.

As seen from these node feasibility calculations, the user may navigate from initially-chosen node $n_1$ to any of the any of the other nodes, further constraining the solution space while remaining consistent with the current node selection.

Continuing with this example, suppose that the user has now navigated to node $n_4$. The new state relevance for state s=2 is now computed, using the structural relevance information for node $n_4$ and the state relevance formulas for subsequent states (defined earlier herein), to determine the entity relevance for this new solution state. (Note that this new solution state represents those entities which remain relevant given that the user has selected an exploration path beginning at node $n_1$, moving next to node $n_4$.) The state relevance for state s=2 is thus computed as follows:

$$S_{s=s+1=2}=(\{e_2\}\cup\{e_1, e_3, e_4, e_5, e_6\})\cap\{e_5, e_6, e_7\}=\{e_5, e_6\}$$

$$W_{s=s+1=2}=(\{e_2\}\cup\{e_1, e_3, e_4, e_5, e_6\})\cap\emptyset=\emptyset$$

$$I_{s=s+1=2}=\{e_7\}\cup\{e_1, e_2, e_3, e_4\}=\{e_1, e_2, e_3, e_4, e_7\}$$

$$E_{s=s+1=2}=\{e_5, e_6\}\cup\emptyset=\{e_5, e_6\}$$

The first of these expressions indicates that the strongly relevant entities for the new state are $e_5$ and $e_6$. As can be seen by inspection, this is determined by adding (through the union operation) the strongly relevant entity of the prior state, $e_2$, to the weakly relevant entities of the prior state, which are $e_1$, $e_3$, $e_4$, $e_5$, and $e_6$, and then taking the intersection of the resulting set $\{e_1, e_2, e_3, e_4, e_5, e_6\}$ with the entities that are strongly relevant to the new node from the structural relevance perspective, which was previously determined to be the set $\{e_5, e_6, e_7\}$. This yields the two entities $e_5$ and $e_6$.

There are no weakly relevant entities for the new state, and thus the relevant entities $E_{s=2}$ are the same ($e_5$ and $e_6$) as the strong entities. The irrelevant entities for this state, as shown by the third expression above, are determined by taking the union of the entity ($e_7$) which was irrelevant in the prior state and those entities ($e_1$, $e_2$, $e_3$, $e_4$) previously determined to be structurally irrelevant for this node (yielding the five entities $e_1$, $e_2$, $e_3$, $e_4$, and $e_7$ which are neither strongly nor weakly relevant for this state).

Given the new state of the solution, it is now possible to calculate the node feasibility for the remaining nodes using the algorithm for node feasibility. Note that since the user traversed to feasible node $n_4$, the list C now contains 2 nodes:

$$C=[n_1, n_4]$$

Beginning with node feasibility for hierarchy k=1, nodes $n_2$ and $n_3$ are both evaluated for feasibility because neither of these nodes is an element of the list in C. The second formula of the feasibility algorithm is applicable to node $n_2$ in the current state, since:

$$[E_{i,k}=\{e_1, e_2, e_3\}]\cap[E_s=\{e_5, e_6\}]=\emptyset,$$

and therefore the node $n_2$ is an infeasible next node from current node $n_4$.

The first formula is applicable to node $n_3$ in this state, since:

$$[E_{i,k}=\{e_4, e_5, e_6\}]\cap[E_s=\{e_5, e_6\}]\neq\emptyset,$$

and therefore the node $n_3$ is a feasible next choice.

Note that node $n_3$ is the only remaining node that remains feasible given the current state of the solution (in other words, has entities that are consistent with this solution state), where the current state has been defined by the constraints specified by the user in selecting nodes $n_1$ and $n_4$.

Hierarchical Exploration

Given the preceding explanation of how entity relevance and node feasibility are calculated, it is now possible to discuss in greater detail how a user is guided by the present invention in performing hierarchical exploration. This discussion refers to the flowcharts in FIGS. 5A through 5L, which depict the logic that may be used (including the formulas and algorithm which have been described above) to implement the preferred embodiment of the invention.

Figure 5A:
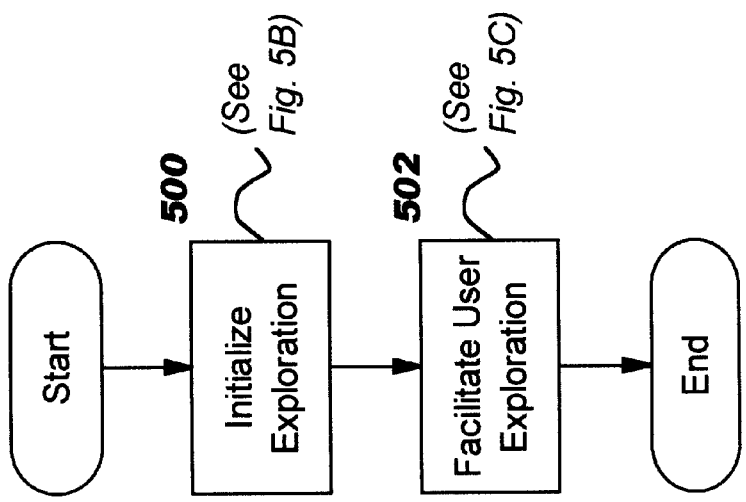

As shown in FIG. 5A, the present invention comprises two major components or processes. First, initialization for the exploration is performed, as indicated by Block 500. This initialization process is explained in more detail below, with reference to FIG. 5B. Following completion of the initialization process, Block 502 indicates that the user's exploration is facilitated. This process is discussed in more detail with references to FIGS. 5C through 5I, and represents the code that will be executed repeatedly while the user continues his hierarchical exploration.

Figure 5B:
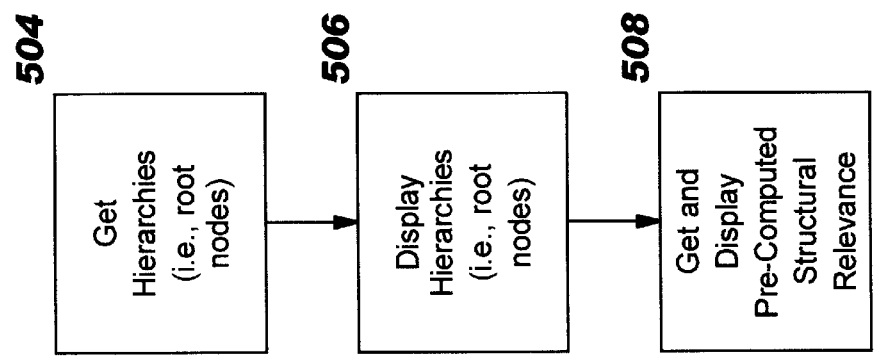
Figure 5F:
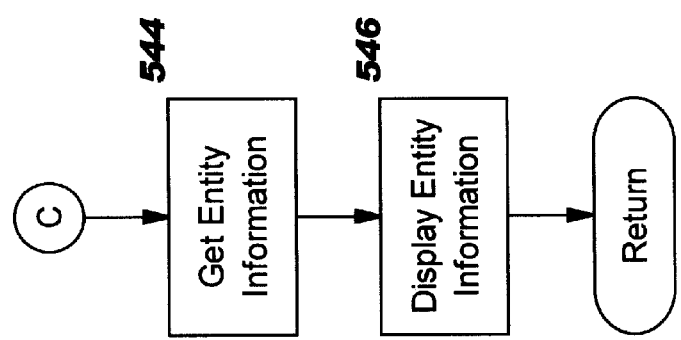

The initialization process depicted in FIG. 5B begins by initializing the user interface, shown at Blocks 504 and 506. Here, the system obtains (Block 504) and displays (Block 506) the top (or root) node for each node hierarchy. Techniques which are well known in the art are used in these blocks. The root nodes for each hierarchy will have been created as the underlying hierarchy nodes and entities were created (using a catalog creation system such as Net.Commerce, for example) and will be accessible (for example, through a system variable or other defined location, the identification of which will be published by each specific catalog system for use with hierarchies created by that system). The root nodes may be displayed using any convenient graphical user interface mechanism, a number of which are commonly available to the developer. In the preferred embodiment, the root nodes are implemented using the metaphor of tabs on a notebook, and the corresponding hierarchy is displayed as a notebook page to which this tab is attached. (Use of this notebook metaphor is well known in the art, being commonly used for displaying "property pages".) Thus, Block 506 comprises displaying the tabs with an identifier of each hierarchy in its tab, and displaying the hierarchy of the first (viewable) page. See, e.g., the tabs 701, 702, and 703 of FIG. 7A, corresponding to the 3 root nodes 601, 631, and 661 of FIGS. 6A, 6B, and 6C. In addition, the first level of the first hierarchy is displayed at 705, comprising graphical representations of the nodes 602, 603, 604 of FIG. 6A. The remaining information displayed on the viewable page (element 700 of FIG. 7A) as will be described in more detail below with reference to the example hierarchies of FIG. 6 and the example graphical user interface screens of FIG. 7.

Block 508 then obtains the pre-computed structural relevance for the nodes in each hierarchy (i.e. for those hierarchies obtained in Block 504), and displays the relevance information for the hierarchy on the viewable page. The computations which were used to create this structural relevance use the formulas which were described in detail above. The logic which may be used to implement these computations is shown in FIG. 5L. (Note that while the structural relevance information is obtained as part of the initialization process, in the preferred embodiment the computation of this information occurs prior to a user beginning a hierarchical exploration, as previously discussed with reference to the space versus speed trade-off. As the structural relevance for a hierarchy is static in nature, it can be pre-computed and stored in this manner, and only needs to be recomputed if there are changes to the nodes, entities, or relationships in the hierarchy.)

Upon completion of the logic of FIG. 5B, exploration is initialized and a user may now interact with the system, using the exploration engine, to perform hierarchical exploration. FIG. 5C depicts, at a high level, the choices that are available to the user during this exploration process. In the preferred embodiment, the user may choose from among five different tasks. Each of these tasks is shown in FIG. 5C, and is more fully described below. As will be obvious to one of skill in the art, additional tasks may be supported, and the logic for these tasks may be added to FIG. 5C without deviating from the inventive concepts disclosed herein.

Any of the five tasks represented in FIG. 5C may be selected at any point during the user's exploration of a hierarchy (or of multiple hierarchies) over a set of entities. As shown in FIG. 5C, the user may perform any of the following exploration tasks: (1) view a hierarchy by selecting that hierarchy, and expanding or collapsing the hierarchical structure (Block 510); (2) select a hierarchy node, where the selection of a feasible node serves to further constrain the relevant entities for the solution state whereas the selection of an infeasible hierarchy node serves to the reset the solution state to the new node (Block 512); (3) select an entity (strongly relevant, weakly relevant, or irrelevant) for display of detailed information describing the selected entity (Block 514); (4) select to "go back" or "undo" (i.e. to return to the previous solution state, by removing the currently-selected node as a bounding constraint and resetting the node focus to the previously-visited node) (Block 516); or (5) explicitly reset the exploration to a beginning state where none of the entities have yet been deemed strongly or weakly relevant or irrelevant (Block 518). Each of these tasks is further described below with reference to the flowcharts in FIGS. 5D, 5E, 5F, 5G, and 5H, respectively.

Note that these user tasks have no inter-dependencies restricting the sequence of their execution. Furthermore, once a task has been chosen by a user and executed by the system, a user may proceed exploring with any of the task options.

FIG. 5D is a flowchart diagram illustrating the task of viewing the nodes comprising a hierarchy, and is invoked when the user selects the task in Block 510 of FIG. 5C. (Preferably, the technique for selecting the hierarchy is to click on the corresponding graphical notebook tab.) In the preferred embodiment, simply viewing the hierarchy does not modify the solution state. This enables a user to switch between hierarchies (i.e. perspectives) at will, for example to refresh his memory regarding the available choices. Block 524 gets the nodes at the first level of this selected hierarchy, and displays those nodes on the viewable notebook page. (Note that while the blocks of FIG. 5D are shown as occurring sequentially, this is for purposes of describing the processes involved. The actual implementation of these processes may be performed in parallel, or may be intermingled. For example, the updated state relevance and node feasibility will preferably be displayed at the same time the first-level nodes are displayed.)

A user may optionally choose to expand or collapse any of the nodes of this hierarchy, as indicated by Block 526. Expanding a node results in display of that node's children nodes, conversely, the collapsing of an expanded node results in the non-display of that node's children (in addition to any of their children). Preferably, a node that can be expanded (i.e. one that has child nodes) will be graphically depicted so as to intuitively convey this status to the user, and a node that is already expanded (and can therefore be selected for collapsing) will have a similar intuitive depiction. For example, a "+" symbol is commonly used to convey that a node can be expanded when displaying hierarchical information such as hierarchical disk file structures. Upon selecting this symbol (e.g. with a mouse), the expanded information is displayed and a "−" symbol is displayed in place of the "+" symbol to indicate that the hierarchy has now been expanded. These concepts are well known in the art, and examples of using this approach for the view hierarchy task of the present invention are illustrated in the graphical user interface displays of FIG. 7, which are discussed below. See, e.g., the highest-level nodes 705 of FIG. 7A, where the "+" symbol indicates that each of these nodes can be expanded to show lower levels of the structure 600 depicted in FIG. 6A.

An example of using the logic of FIG. 5D is discussed below with reference to selection of the "Operating Environment" tab (and its associated root node 631) in FIG. 7G. An example of expanding nodes of the hierarchy is described with reference to FIG. 7B. Upon completion of the logic of FIG. 5D, control returns to the invoking logic in FIG. 5C.

FIG. 5E is a flowchart diagram illustrating the task of selecting a hierarchical node. The logic of this flowchart is invoked when the user selects one of the displayed hierarchy nodes (for example, by clicking on a graphical representation of the node), and corresponds to the task selection in Block 512 of FIG. 5C. Block 528 asks whether this selected node was a feasible node. Note that initially, when a user is beginning exploration from an initial state, all nodes in all hierarchies are feasible. If this test has a negative response (i.e. the user selected an infeasible node), then control transfers to Block 530, where the solution state is reset. As previously discussed, this comprises replacing any nodes in the Node Constraint List [C] with the current node (Block 530), and setting the state counter used for computing state relevance to an initial value such as zero (Block 532). If the test in Block 528 has a positive response (i.e. a feasible node was selected), on the other hand, control transfers to Block 534, where the selected node is added to the list of nodes recorded in the Node Constraint List. As described previously, this is the list of mutually feasible nodes that serves to define and constrain the solution space. Block 536 then increments the state counter value.

Block 538 is reached after completion of Block 532 or Block 536. This block begins the calculation of a new solution state using the existing state relevance and the constraints imposed by the node constraint list. This processing comprises: (1) calculating the state relevance for the new state (reflected in Block 538), and (2) determining the new set of feasible and infeasible nodes to which a user may navigate (Block 540). Once the new solution state has been calculated, the user interface information is refreshed, as indicated by Block 542 (and described in more detail with reference to FIG. 5I). Control then returns to FIG. 5C, where the user may now elect to continue exploration by proceeding with any of the tasks available for performing exploration. An example of using the logic of FIG. 5E is discussed below with reference to selecting the "Portrait" node (element 602 of FIG. 6A) in FIGS. 7C and 7D.

Note that for the task of selecting a hierarchical node, as described above for FIG. 5E, the user's node selection sets the "system focus" on the node that is of interest to the user (referred to herein as the "node focus"). The following system responses then occur, as has been described: (1) the system obtains and displays the strongly relevant entities for the node focus given the solution state; these are all the entities that exist under (or are instances of) the focus node as well as satisfy the constraints represented by those nodes in the Node Constraint List; (2) the system obtains and displays the weakly relevant entities for the node focus given the solution state; these are the entities that exist under (or are instances of) descendants or ancestors of the focus node as well as satisfy the constraints represented by those nodes in the Node Constraint List; (3) the system obtains and displays the irrelevant entities for the node focus given the solution state; these are all the entities that exist neither under (or are not instances of) the focus node, nor ancestors of the focus node, nor descendants of the focus node, nor satisfy the constraints represented by those nodes in the Node Constraint List; and (4) the system performs node forward-checking (by calculating state relevance and node feasibility based on the user's solution state) and displays to the user information that indicates those hierarchy nodes that are feasible/infeasible.

Figure 7A:
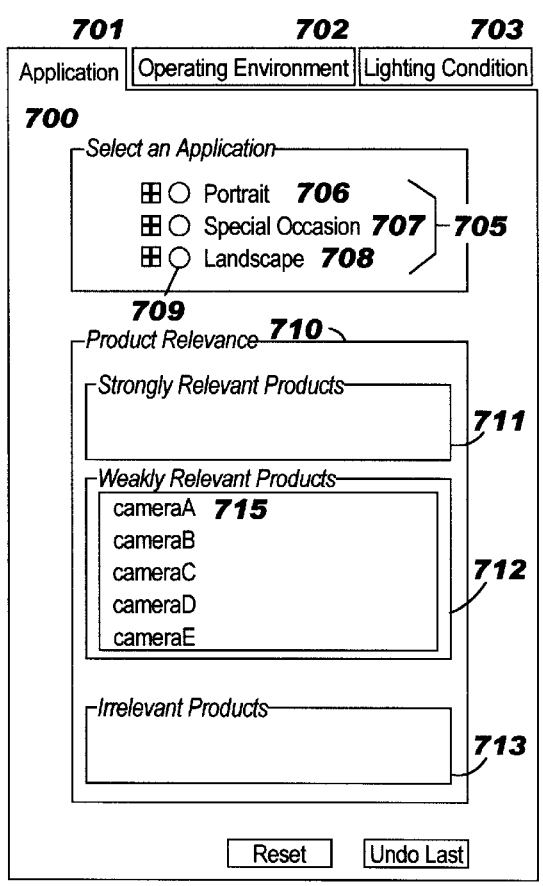
FIGS. 7A through 7N show a series of graphical user interface depictions, in a style that may be used with the present invention, where this series illustrates several examples of exploring the hierarchies of FIG. 6.

As a part of exploration, a user may at any time select an entity (preferably by clicking on the graphical representation of the entity, such as element 715 of FIG. 7A), in order to see a display of detailed information about that entity. This corresponds to the task selection in Block 514 of FIG. 5C, and is illustrated by the flowchart diagram in FIG. 5F. The entity information is obtained (Block 544) and displayed (Block 546) using techniques which do not form part of the present invention. Typically, the catalog creation system stores entity information in a product database or other persistent storage, and provides an application programming interface (API) or system call with which the stored information can be obtained programmatically. The manner in which this obtained information is then displayed will depend on the particular type of entity and its pertinent data, the environment in which the present invention is used, etc. If the present invention is used in a Web environment, the entity information may be formatted as a HyperText Markup Language (HTML) page displayable in a Web browser. Once the entity information has been displayed, control returns to FIG. 5C to enable the user to make further exploration choices.

FIG. 5G is a flowchart diagram illustrating the task of selecting to "go back" or "undo", corresponding to Block 516 of FIG. 5C. The current node is removed from the Node Constraint list, C (Block 548), thereby returning to the constraint list of the previous solution state. The node focus is then reset to the previously-visited node (Block 550). Block 552 resets the state by decrementing the state counter. The state relevance information and node feasibility are then recomputed (Block 554), as discussed in detail earlier herein, to reflect this new state. The user interface is then refreshed with this new information at Block 556 (see FIG. 5I); and control then returns to the invoking logic in FIG. 5C.

The logic of Blocks 548, 550, and 552 may be performed in parallel or in a different sequence than that shown in FIG. 5G, without deviating from the inventive concepts disclosed herein. An example of using the logic of FIG. 5G is discussed below with reference to choosing "Undo Last" in FIG. 7E and the resulting display in FIG. 7F.

Figure 5H:
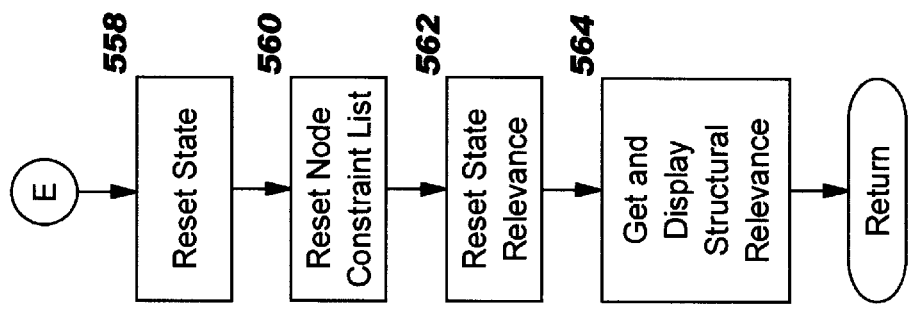

Explicitly selecting to reset the exploration engine (by selecting the task corresponding to Block 518 of FIG. 5C) enables a user to re-initiate exploration from any node in the hierarchy. This is described in FIG. 5H, which shows that resetting the system begins by resetting the solution state (Block 558) to an initial value (preferably, setting the state counter to zero to indicate that the state relevance information is currently undefined). Block 560 resets the Node Constraint List to empty or null, and Block 562 resets the state relevance to an undefined state. (Note that there is no valid state relevance information until the user selects the node from which he will begin re-exploring the hierarchy.) The structural relevance for the nodes in the currently-viewable hierarchy is obtained and displayed on the user interface at Block 564, after which control returns to the invoking logic of FIG. 5C. An example of invoking the logic of FIG. 5H is discussed with reference to FIGS. 7J and 7K below.

Note that the preferred embodiment for the set of user tasks, described above, assumes that a user is constantly presented with a graphical depiction of which entities are strongly relevant, which are weakly relevant, and which are irrelevant. These sets of entities are "refreshed" with the addition of each new constraint (i.e., each subsequent node selection) to reflect the new solution state. In an alternative embodiment, the display of the entities may be implemented as a separately-invocable function that would require explicit user execution. For example, the user may be required to click on a choice from a pop-up or pull-down menu, or press a function key or graphical button associated with the explicit information request. The choices displayed to the user in this alternative embodiment may provide a single "Refresh" choice for all relevance and feasibility information, or may provide separate choices for each type of information (such as "Refresh strongly relevant entities", etc.).

FIG. 5I illustrates refreshing the graphical user interface display. This logic is invoked from a number of the other flowcharts of the preferred embodiment, and comprises (1) displaying the state relevance for the current state (Block 566) and the node feasibility for the nodes on the viewable page (Block 568). While these processes are shown as executing sequentially in FIG. 5I, it will be obvious that they may be performed in parallel or in a different order without deviating from the inventive concepts disclosed herein.

In the preferred embodiment, implementation of the structural relevance and state relevance computations described earlier is performed by issuing appropriate relational database query commands, which are then performed by a relational database engine. This provides an efficient technique for performing the set operations which comprise these computations. In addition, the set operations of the node feasibility calculations are preferably performed in this manner, with programming language statements added (e.g. for maintaining the node constraint list "C" and performing the "If" operations on the query results).

An Example of Hierarchical Exploration

Now that the logic of the preferred embodiment has been described, its use will be illustrated by describing how the exploration engine would be utilized by a user or shopper in an electronic catalog to search for products or parts (i.e., entities) meeting the user's requirements.

Figure 6A:
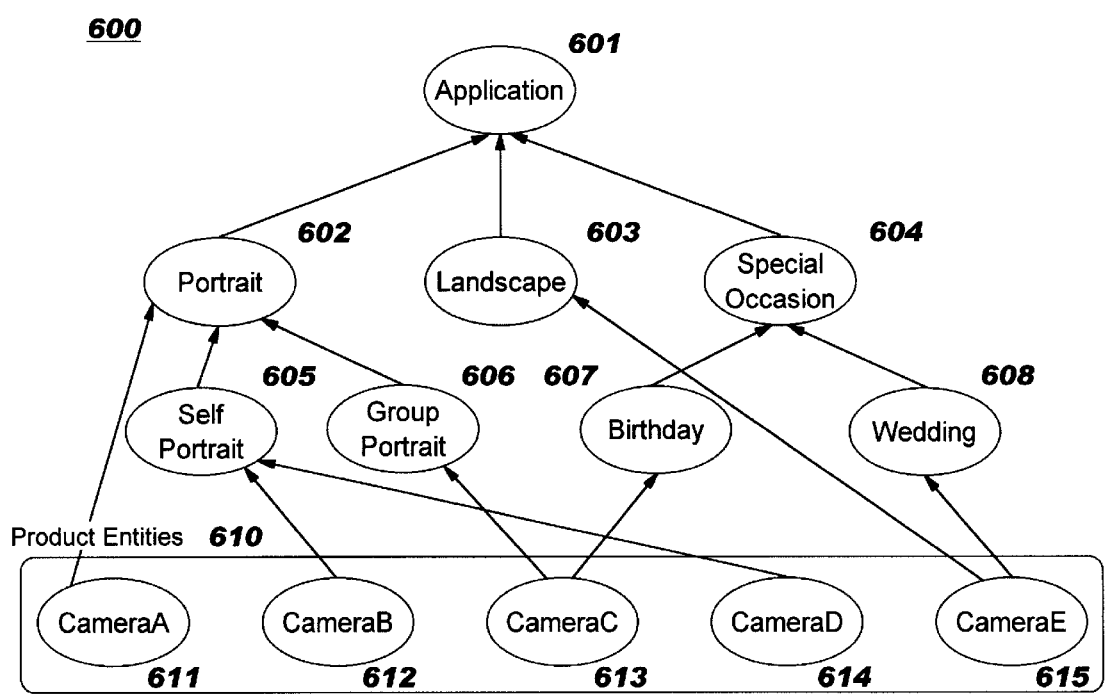

This example of catalog exploration uses the hierarchies 600, 630, and 660 in FIGS. 6A, 6B, and 6C. Each of these hierarchies is a category (i.e., node) hierarchy, and has associated products (i.e., entities), which in this example are cameras. Note that the multiple hierarchies 600, 630, 660 reside over a single set 610 of entities, and that each entity may or may not be associated with a node in a particular hierarchy. Each hierarchy offers a different perspective on the camera product set: FIG. 6A classifies the cameras according to an application, or type of use, perspective; FIG. 6B classifies the cameras according to an operating conditions perspective; and FIG. 6C classifies the cameras according to a lighting conditions perspective. For example, it can be seen that CameraA 611 has application for portraits (node 602 in FIG: 6A), is suited only to dry operating environments (node 632 of FIG. 6B), and is used in sunlight (node 662 of FIG. 6C). CameraE 615, on the other hand, may be used in landscape 603 applications or in special occasion 604 applications, and in particular in wedding 608 applications; is suited to either dry 632 or wet 634 operating environments; and is used in indoor light 663. (As has been stated, creation of the hierarchies and the specific entities in the hierarchies uses techniques which are known in the art, such as a catalog creation system, and does not form part of the present invention.)

FIGS. 7A through 7N display a series of graphical user interface depictions, in a style that may be used with the present invention to enable the user to interact in the exploration of the hierarchies shown in FIGS. 6A through 6C. Three cases (i.e. paths through the hierarchies) will be illustrated in this example. First, considering FIG. 7A, notice that the hierarchies (or different perspectives) have been implemented as tabs 701, 702, 703 on a notebook metaphor in the graphical user interface (GUI), as previously discussed. A textual description of each hierarchy is presented on each tab. Alternatively, graphical depictions such as icons could be used. The top portion of the screen 700 allows for the display of the hierarchy nodes for the given perspective. Therefore, in FIG. 7A, the top-level category nodes 602, 604, 603 of the chosen "Application" hierarchy 600 are displayed at 706, 707, 708. In the preferred embodiment, a "+" sign next to the category indicates that the category may be further expanded to display the children categories; a "−" sign next to the category indicates that the category has already been expanded. Preferably, each expandable node is displayed in its unexpanded form until a user explicitly selects to expand it; alternatively, the fully-expanded hierarchy may be displayed if desired.

The present invention uses the concept of feasible nodes and infeasible nodes to guide a user in exploration, as has been discussed above. In the preferred embodiment, a graphical indication of which nodes on the viewable page are feasible for the current state of the solution will be provided, as will a different graphical indication of which nodes are infeasible. In the example GUI screens of FIG. 7, an empty circle (see, e.g., element 709 in FIG. 7A) has been used to indicate a feasible node, and a circle containing an "X" (see element 725 of FIG. 7C) indicates an infeasible node. Initially, before the user has begun exploration, all categories (i.e. nodes) are feasible.

The lower portion of the screen 700 shows the product (entity) relevance 710, given the structural relevance for the root node (in FIG. 7A) corresponding to the notebook tab. This information is preferably organized into a "Strongly Relevant" area 711, a "Weakly Relevant" area 712, and an "Irrelevant" area 713, as shown in FIG. 7A. Note that in FIG. 7A, where the user has clicked on the Application tab (and thus the root node 600), all the camera entities are weakly relevant. Thus, the 5 camera identifiers are displayed in the window of the weakly relevant area 712.

Figure 7B:
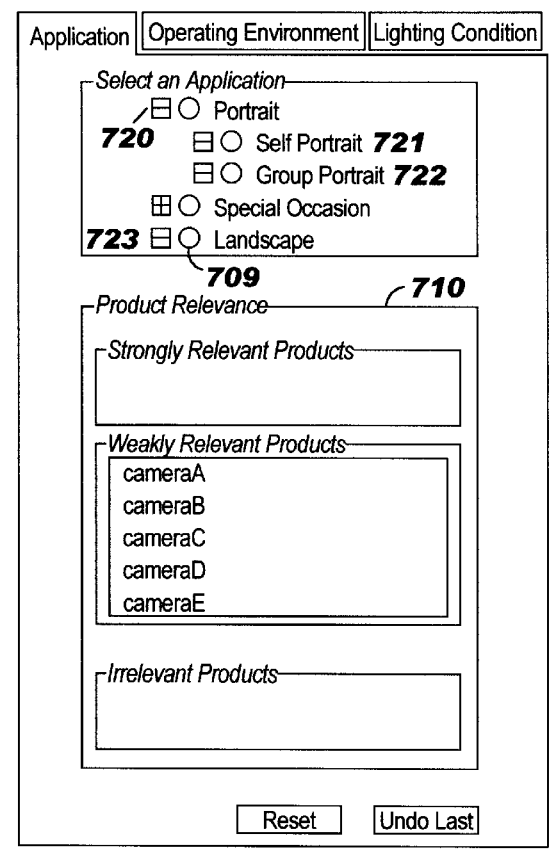

FIG. 7B illustrates the result of the user selecting to expand hierarchical nodes. The Portrait category 706 has been expanded, changing its expansion icon to the "−" symbol 720 and displaying its children nodes "Self Portrait" 721 and "Group Portrait" 722. Each of these nodes, as well as "Landscape" 708, have also been expanded, as indicated by the "−" symbols; however, none of these nodes has child nodes, and thus no additional node information is displayed. Note that the product relevance information 710 and node feasibility indicators (e.g. 709) have remained unchanged as a result of the user's expanding nodes. This is because the user may choose to view different parts of the currently-displayed hierarchy (for example, to better understand how the catalog and its choices are organized) without actually selecting to traverse to its nodes. Product relevance and feasibility information only changes as the state changes— that is, as the user selects nodes to further constrain the solution space, or selects to reset the solution space.

Figure 7C:
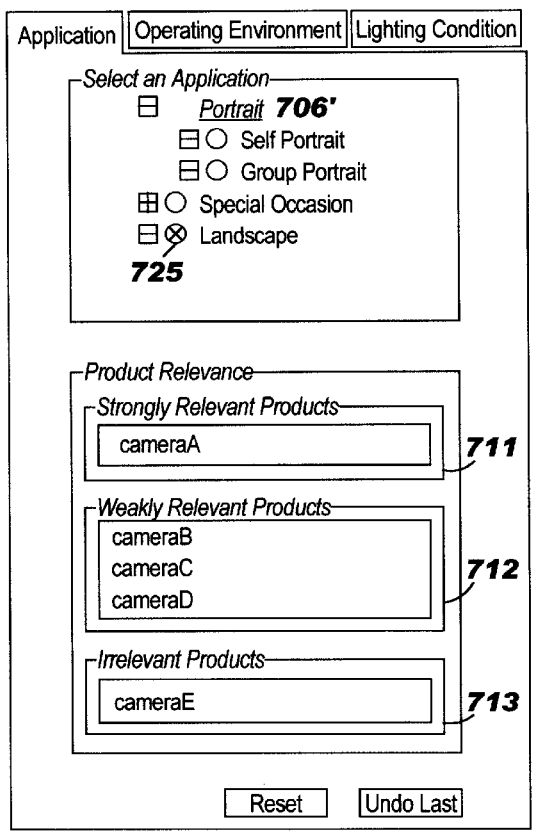
Figure 7D:
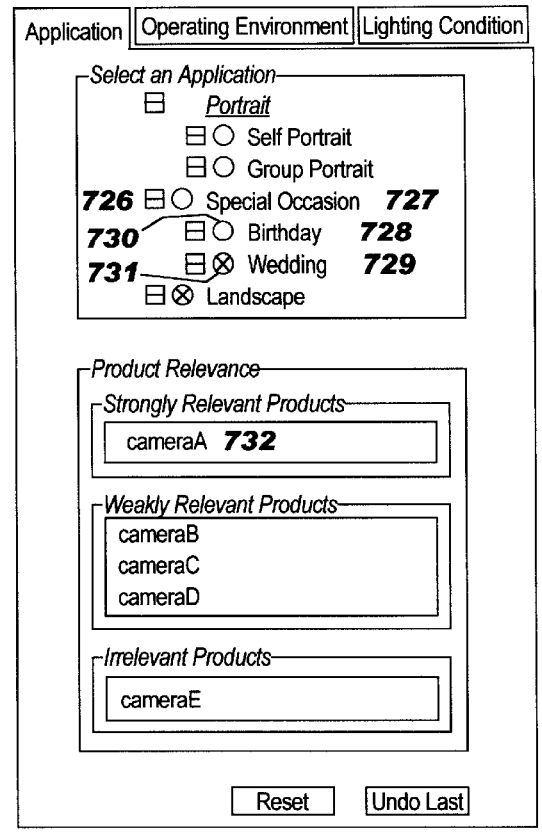
Figures 7K, 7L:
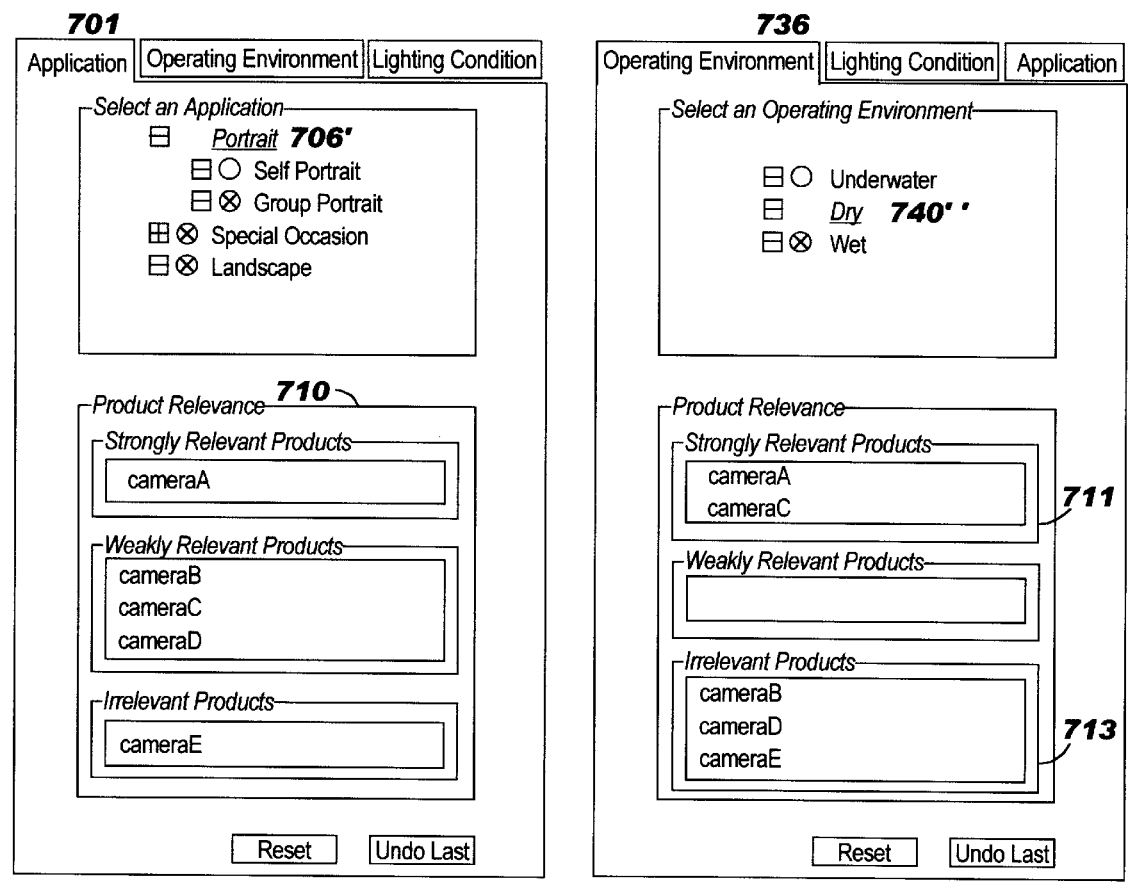

In FIG. 7C the user has begun exploration by the selection of his first choice of a category node, "Portrait", to bound the solution space. Note that in the GUI screens of FIG. 7, a user's selection of a category node is indicated by the category node name being displayed in italics and underlined (see element 706'). Other techniques for indicating node selection may be used alternatively. Notice in FIG. 7C that as a result of selecting the "Portrait" category 706, the "Landscape" category has become infeasible (see element 725). In addition, the products' relevance has changed: "CameraA" is now strongly relevant and is therefore moved to the window in area 711; and "CameraE" is now irrelevant, and is therefore shown in the window of area 713. Next, as represented in FIG. 7D, the user expands 726 the "Special Occasion" node 727 and sees that it has sub-categories of "Birthday" 728 and "Wedding" 729. Note that the user has not traversed from his first-selected node "Portrait" 706, and thus the product relevance 710 in FIG. 7D is unchanged from FIG. 7C. The feasibility, as it has been previously calculated (i.e. following the most recent node selection) for the state where the Node Constraint List contains only the Portrait node, is displayed for the newly-expanded sub-categories Birthday 728 and Wedding 729. These sub-categories are depicted as being feasible (730) and infeasible (731), respectively.

In FIG. 7E, the user then selects the "Birthday" category 728, causing its node name to become italicized and underlined 728'. This new node selection causes the state relevance and node feasibility to be updated. In this new state, "CameraA" is determined to now be irrelevant 733 instead of its previous strongly relevant status 732. (Refer to FIG. 6A, which indicates that CameraA 611 is a Portrait camera but it is not a Birthday camera, not being an instance of Birthday node 607 or any of it ancestors; thus, the user has ruled out this choice of product by the navigation path selected.) "CameraB", "CameraD", and "CameraE" are also now irrelevant. "CameraC", on the other hand, has become strongly relevant 734. This state relevance, where CameraC is the only relevant choice of products, corresponds to the user having constrained the solution space to those cameras that have application as Portrait cameras (by his first selecting Portrait node as shown at 706' in FIG. 7C) and are also suitable for Birthday applications (by next selecting the Birthday node as shown at 728' in FIG. 7E). Referring to the Application hierarchy in FIG. 6A, it can be seen that CameraC 613 is the only camera which is a descendant of both the Portrait node 602 and the Birthday node 607, and thus is the only product or entity meeting both of these constraints.

Suppose that the user decides he has inadvertently restricted his solution space too narrowly, by leaving only a single relevant product 734. He may then select "Undo Last" 735 on the GUI, to return to the state in which he was previously. The result of this selection is shown in FIG. 7F, and represents the solution space where the only constraint is the selection of the "Portrait" application (as in FIG. 7D). (Note that Birthday node 728 is no longer italicized and underlined, indicating its "deselection" as a result of the Undo operation.)

Next, the user navigates to the "Operating Environment" perspective by selecting the associated tab 736, as shown in FIG. 7G. This causes the viewable page 737 to change such that the hierarchy 630 of FIG. 6B is displayed at 738. Here, the "Underwater" 739 and "Dry" 740 categories are indicated as feasible choices, while the "Wet" category 741 is infeasible. This node feasibility information is with respect to the existing solution space where the Portrait node is the only node that has been selected, and thus is the single element in the Node Constraint list. By referring to FIGS. 6A and 6B, it can be seen that none of the 4 relevant entities for the current solution state (i.e. entities 611, 612, 613, and 614 which are instances of Portrait node 602 or its descendants) are reachable from the "Wet" node 634, so that its representation at 741 as an infeasible selection guides the user in his further navigation toward a product selection. Suppose the user next chooses the Underwater category 739, as indicated at 739' of the resulting FIG. 7H. Having chosen the Portrait and Underwater categories, the user is indicating that he is interested in cameras which can be used in portrait applications and operated in underwater environments. Accordingly, the state relevance and node feasibility are updated to reflect this new state, and the GUI indicates that "CameraB" and "CameraD" have become strongly relevant 742 (as being the only 2 products meeting both current constraints) while "CameraA" and "CameraC" have become irrelevant 743, along with the previously-irrelevant "CameraE". The Dry category is now shown as infeasible at 740', along with infeasible category Wet 741, as none of the strongly relevant nor weakly relevant products in the current solution space are reachable as instances of these categories.

In FIG. 7I, the user has navigated to the "Lighting Condition" perspective by selecting tab 744. Notice that the "Sun Light" category 745 is feasible and the "Indoor Light" category 746 is infeasible, representing the previously-calculated feasibility for these nodes, and that the product relevance 710 remains unchanged when selecting this new hierarchy. The selection of the "Sun Light" category, shown at 745' in FIG. 7J, causes the state relevance and node feasibility to be recomputed. (Recall that the constraints at this point in the user's exploration are portrait application, underwater environment, and sunlight lighting conditions.) The updated state relevance is unchanged as compared to the previous state: both "CameraB" and "CameraD" are still strongly relevant 742 with the addition of the new category "Sun Light" to the solution state. (Refer to FIG. 6C, where it can be seen that both CameraB 612 and CameraD 614 are reachable from the Sun Light node 662, indicating that these are both cameras meeting this constraint.)

After having selected the "Sun Light" category in FIG. 7J, suppose the user has chosen to "Reset" the exploration by selecting the button 747. This has the effect of removing the previously imposed category selections (i.e., constraints) from bounding the solution space. Therefore, in FIG. 7K, the user begins exploration anew by selecting the Application perspective 701 and then its "Portrait" category 706' (as in FIG. 7C). Accordingly, the product relevance information 710 is displayed in terms of this single constraint. Next, in FIG. 7L, the user moves to the "Operating Environment" perspective 736 and selects the "Dry" category 740". Notice that this action has the result of placing "CameraC" in the strongly relevant section 711, along with "CameraA"; in addition "CameraB" and "CameraD" are placed in the irrelevant section 713 along with "CameraE". This solution space then represents those cameras which can be used in portrait applications and in dry environments.

Next, in FIG. 7M the user returns to the "Application" perspective 701. The product relevance 710 remains unchanged. In FIG. 7N, the user selects the "Group Portrait" category as indicated at 722'. The state relevance and node feasibility are recomputed, to reflect the constraints of "Portrait" and "Dry" and "Group Portrait". This results in "CameraA" being moved from the strongly relevant section 711 to the weakly relevant section 712. Note that "CameraA" 611 is found directly under (or is an instance of) the "Portrait" category 602 in FIG. 6A, hence, "CameraA" is an example of a weakly relevant entity that is more generalized than strongly relevant entity "CameraC" (since the category "Portrait" 602 is more general than the category "Group Portrait" 606).

As has been demonstrated, the present invention discloses advantageous techniques for hierarchical exploration over one or more hierarchies which may reside over a set of entities. Entity relevance and node-based forward-checking are defined and combined in a novel manner to provide a powerful yet flexible technique for locating entities (e.g. products or parts) in a large information space using hierarchical navigation and browsing of these one or more hierarchies. Each of the multiple hierarchies may provide different perspectives on the set of entities. Thus, use of the present invention enables a user to search for a solution meeting his selected constraints from a multi-perspective viewpoint, guiding him through ascent and descent in a hierarchy as well as lateral exploration and movement to other hierarchies. A further advantage of the present invention is its use of existing hierarchy and entity information, such that it is readily usable without alteration of this already-created information.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product on a computer-readable medium in a computing environment for improving user exploration through multiple hierarchies of information, comprising:

computer-readable program code means for computing a structural relevance for each of a root node and one or more intermediate nodes in each of one or more category hierarchies, each of said category hierarchies comprising said root node, said one or more intermediate nodes, and one or more leaf nodes, wherein each of said root nodes and said intermediate nodes corresponds to a category in said hierarchy and wherein each of said leaf nodes corresponds to an entity categorized by said hierarchy;

computer-readable program code means for enabling a user of said computer program product to select a particular one of said root nodes or said intermediate nodes;

computer-readable program code means, responsive to operation of said computer-readable program code means for enabling, for computing a state relevance reflecting said selection;

computer-readable program code means, responsive to operation of said computer-readable program code means for computing said state relevance, for computing a node feasibility reflecting said state relevance; and computer-readable program code means for displaying a graphical representation of said computed node feasibility to guide said user in exploring said one or more category hierarchies.

2. The computer program product for improving user exploration through multiple hierarchies of information according to claim 1, wherein said computer-readable program code means for computing said structural relevance further comprises computer-readable program code means for determining a static set of strongly relevant, weakly relevant, irrelevant, and relevant ones of said entities for each of said root nodes and said intermediate nodes.

3. The computer program product for improving user exploration through multiple hierarchies of information according to claim 2, wherein said computer-readable program code means for computing said state relevance further comprises computer-readable program code means for determining a dynamic set of strongly relevant, weakly relevant, irrelevant, and relevant ones of said entities based upon a previous state of said dynamic set and said static set for said selected node.

4. The computer program product for improving user exploration through multiple hierarchies of information according to claim 1, wherein said computer-readable program code means for computing said node feasibility further comprises computer-readable program code means for determining a feasible or non-feasible status of each of said root nodes and said intermediate nodes which have not yet been selected.

5. The computer program product for improving user exploration through multiple hierarchies of information according to claim 4, wherein said computer-readable program code means for determining said feasible or non-feasible status determines said status to be feasible when said static set of relevant ones for said selected node has at least one entity in common with said dynamic set of relevant ones, and determines said status to be infeasible otherwise.

6. A system in a computing environment for improving user exploration through multiple hierarchies of information, comprising:

means for computing a structural relevance for each of a root node and one or more intermediate nodes in each of one or more category hierarchies, each of said category hierarchies comprising said root node, said one or more intermediate nodes, and one or more leaf nodes, wherein each of said root nodes and said intermediate nodes corresponds to a category in said hierarchy and wherein each of said leaf nodes corresponds to an entity categorized by said hierarchy;

means for enabling a user of said system to select a particular one of said root nodes or said intermediate nodes;

means, responsive to operation of said means for enabling, for computing a state relevance reflecting said selection;

means, responsive to operation of said means for computing said state relevance, for computing a node feasibility reflecting said state relevance; and means for displaying a graphical representation of said computed node feasibility to guide said user in exploring said one or more category hierarchies.

7. The system for improving user exploration through multiple hierarchies of information according to claim 6, wherein said means for computing said structural relevance further comprises means for determining a static set of strongly relevant, weakly relevant, irrelevant, and relevant ones of said entities for each of said root nodes and said intermediate nodes.

8. The system for improving user exploration through multiple hierarchies of information according to claim 7, wherein said means for computing said state relevance further comprises means for determining a dynamic set of strongly relevant, weakly relevant, irrelevant, and relevant ones of said entities based upon a previous state of said dynamic set and said static set for said selected node.

9. The system for improving user exploration through multiple hierarchies of information according to claim 6, wherein said means for computing said node feasibility further comprises means for determining a feasible or non-feasible status of each of said root nodes and said intermediate nodes which have not yet been selected.

10. The system for improving user exploration through multiple hierarchies of information according to claim 9, wherein said means for determining said feasible or non-feasible status determines said status to be feasible when said static set of relevant ones for said selected node has at least one entity in common with said dynamic set of relevant ones, and determines said status to be infeasible otherwise.

11. A method for improving user exploration through multiple hierarchies of information in a computing environment, comprising the steps of:

computing a structural relevance for each of a root node and one or more intermediate nodes in each of one or more category hierarchies, each of said category hierarchies comprising said root node, said one or more intermediate nodes, and one or more leaf nodes, wherein each of said root nodes and said intermediate nodes corresponds to a category in said hierarchy and wherein each of said leaf nodes corresponds to an entity categorized by said hierarchy;

enabling a user of said method to select a particular one of said root nodes or said intermediate nodes;

computing a state relevance reflecting said selection, responsive to operation of said enabling step;

computing a node feasibility reflecting said state relevance, responsive to operation of said step of computing said state relevance; and displaying a graphical representation of said computed node feasibility to guide said user in exploring said one or more category hierarchies.

12. The method for improving user exploration through multiple hierarchies of information according to claim 11, wherein said step of computing said structural relevance further comprises the step of determining a static set of strongly relevant, weakly relevant, irrelevant, and relevant ones of said entities for each of said root nodes and said intermediate nodes.

13. The method for improving user exploration through multiple hierarchies of information according to claim 12, wherein said step of computing said state relevance further comprises the step of determining a dynamic set of strongly relevant, weakly relevant, irrelevant, and relevant ones of said entities based upon a previous state of said dynamic set and said static set for said selected node.

14. The method for improving user exploration through multiple hierarchies of information according to claim 11, wherein said step of computing said node feasibility further comprises the step of determining a feasible or non-feasible status of each of said root nodes and said intermediate nodes which have not yet been selected.

15. The method for improving user exploration through multiple hierarchies of information according to claim 14, wherein said step of determining said feasible or non-feasible status determines said status to be feasible when said static set of relevant ones for said selected node has at least one entity in common with said dynamic set of relevant ones, and determines said status to be infeasible otherwise.

16. A method of guiding user exploration of hierarchically-structured information in a computing environment, comprising steps of:

programmatically analyzing a category hierarchy, said hierarchy comprising a root node, one or more intermediate nodes, and one or more leaf nodes, wherein each of said root nodes and said intermediate nodes corresponds to a category in said hierarchy and wherein each of said leaf nodes corresponds to an entity categorized by said hierarchy, to determine how directly the root node and the one or more intermediate nodes are related to the entities at the leaf nodes;

programmatically determining, responsive to a user selecting to navigate from said root node to one of said intermediate nodes, or from one of said intermediate nodes to another of said intermediate nodes, which of said entities remains a feasible selection for a navigation path which comprises said nodes selected for said navigating; and displaying, responsive to said programmatically determining step, a graphical representation of said entities that remain feasible selections.

17. The method according to claim 16, wherein said category hierarchy represents an electronic catalog and wherein said entities are products available from said electronic catalog.

18. The method according to claim 16, wherein said category hierarchy represents an electronic catalog and wherein said entities are parts available from said electronic catalog.

19. The method according to claim 16, wherein said category hierarchy represents an on-line auction service and wherein said entities are products being offered at auction through said on-line auction service.

* * * * *